United States Patent
Sudo et al.

(10) Patent No.: US 7,532,620 B2
(45) Date of Patent: May 12, 2009

(54) ROUTING TABLE SYNCHRONIZATION METHOD, NETWORK APPARATUS, AND ROUTING TABLE SYNCHRONIZATION PROGRAM

(75) Inventors: Toshiyuki Sudo, Kawasaki (JP); Naoki Oguchi, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 795 days.

(21) Appl. No.: 11/023,808

(22) Filed: Dec. 28, 2004

(65) Prior Publication Data

US 2005/0220109 A1  Oct. 6, 2005

(30) Foreign Application Priority Data

Mar. 31, 2004  (JP)  ............................ 2004-105972

(51) Int. Cl.
  *H04L 12/28*  (2006.01)
  *G06F 15/173*  (2006.01)
(52) U.S. Cl. .................... 370/389; 370/218; 370/392; 370/409; 370/466; 370/503; 709/223; 709/239; 709/242; 709/243
(58) Field of Classification Search .................. 370/218, 370/228, 389, 401, 466, 392, 409, 503; 709/223, 709/239, 242, 243
See application file for complete search history.

(56) References Cited

U.S. PATENT DOCUMENTS 4,592,048 A * 5/1986 Beckner et al. ............. 370/354
4,942,574 A * 7/1990 Zelle .......................... 370/400
5,689,689 A * 11/1997 Meyers et al. ............... 713/375
6,085,238 A * 7/2000 Yuasa et al. ................. 709/223
6,765,863 B1 * 7/2004 Wakimoto et al. .......... 370/218
6,970,972 B2 * 11/2005 Hosoya ....................... 711/113
2003/0056138 A1* 3/2003 Ren .............................. 714/4
2003/0093557 A1* 5/2003 Giraud et al. ............... 709/239
2004/0001485 A1* 1/2004 Frick et al. .................. 370/389
2005/0135357 A1* 6/2005 Riegel et al. ................ 370/389

FOREIGN PATENT DOCUMENTS

JP  06-066813  3/1994

* cited by examiner

*Primary Examiner*—Edan Orgad
*Assistant Examiner*—Venkatesh Haliyur
(74) *Attorney, Agent, or Firm*—Katten Muchin Rosenman LLP

(57) ABSTRACT

In a network apparatus including a forwarding unit corresponding to a base point for conducting packet transmission/reception with an external network, and plural control units for operating plural applications that are arranged to access virtual interfaces of the control units that correspond to actual interfaces of the forwarding unit so that the network apparatus appears from the outside to be functioning as a single unit. A routing process of generating a routing table is executed at a master control unit corresponding to one of the control units, and if the routing table of the master control unit is updated, a routing table of the forwarding unit is updated by a routing synchronization process that operates independently from the routing process. One or more routing tables of one or more slave control units corresponding to the control units other than the master control unit are updated through the forwarding unit.

10 Claims, 18 Drawing Sheets

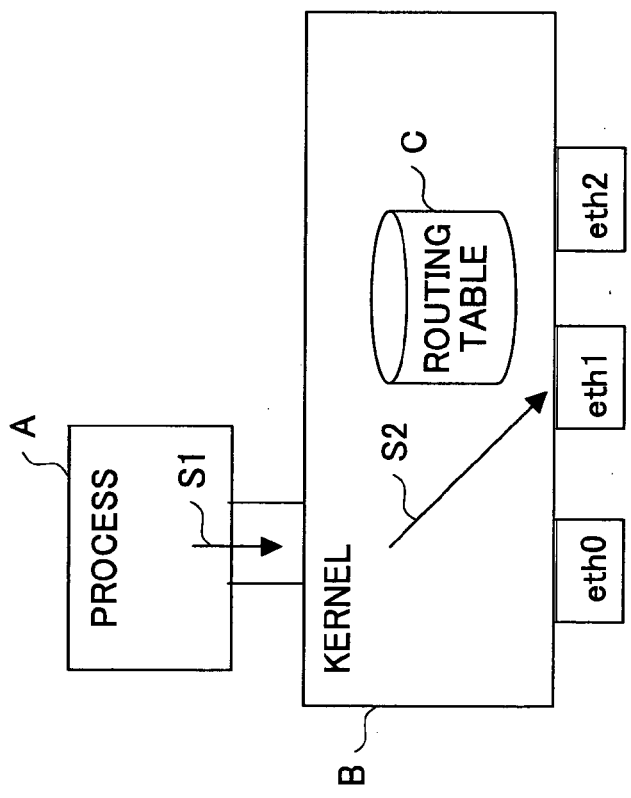

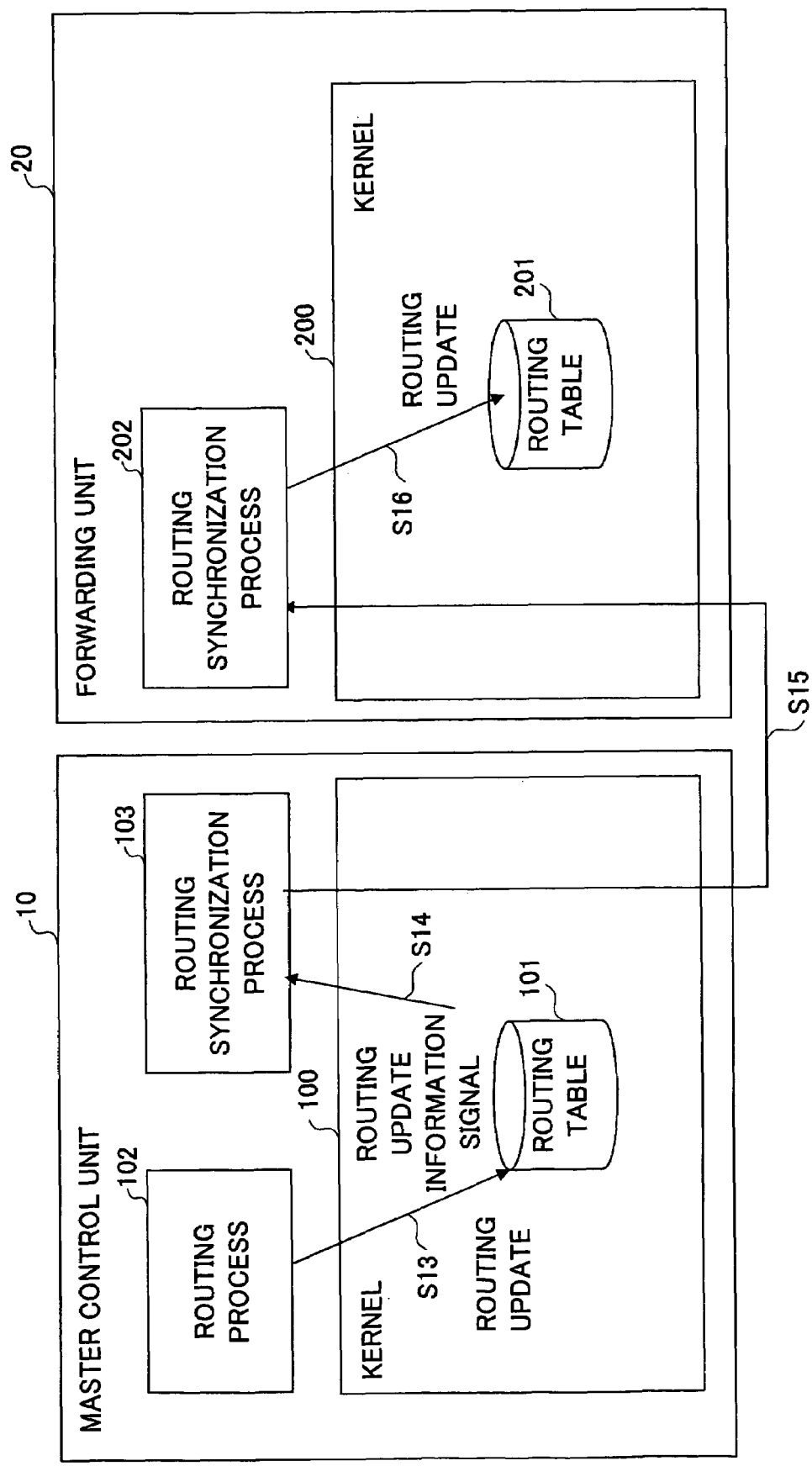

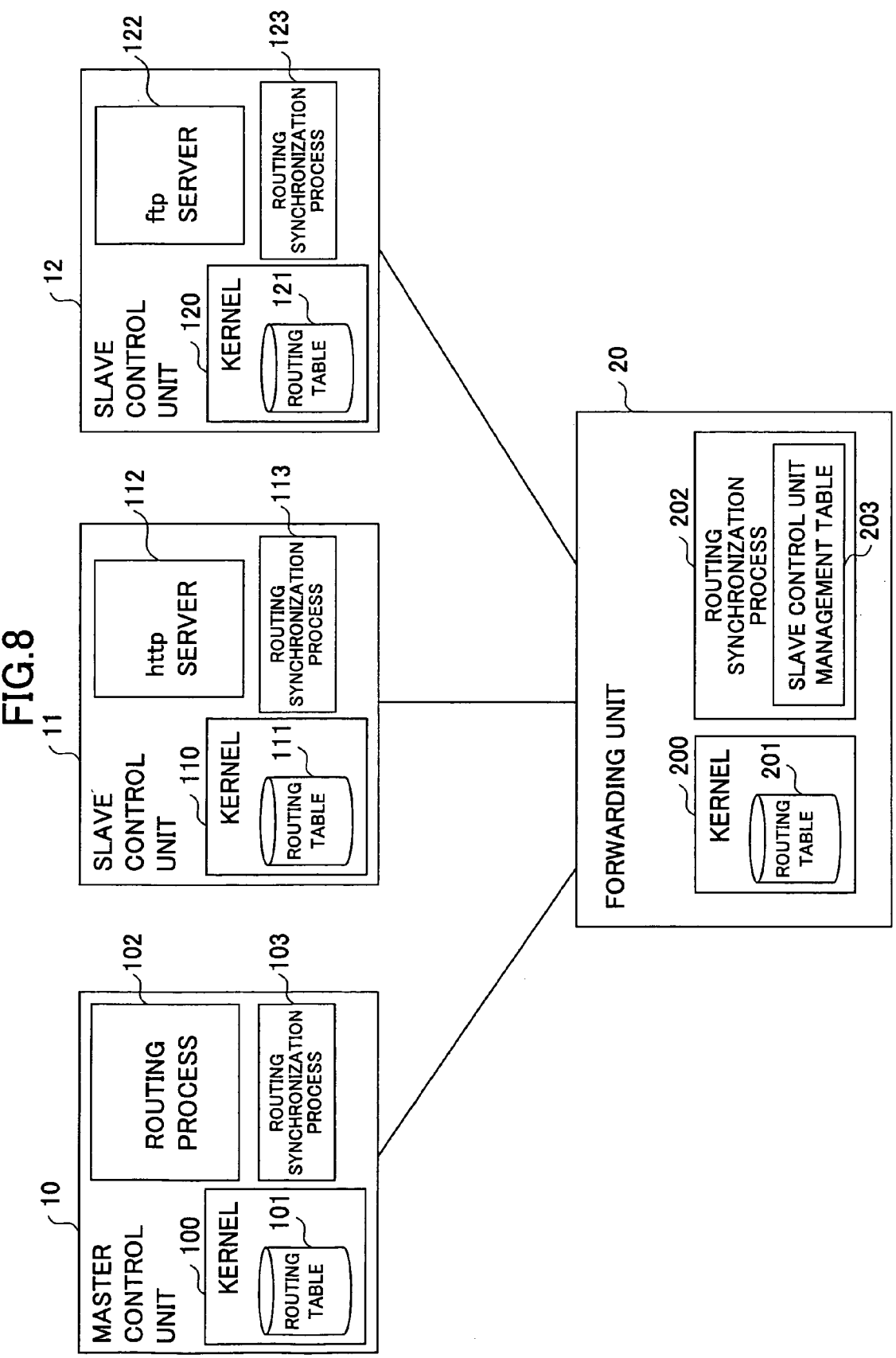

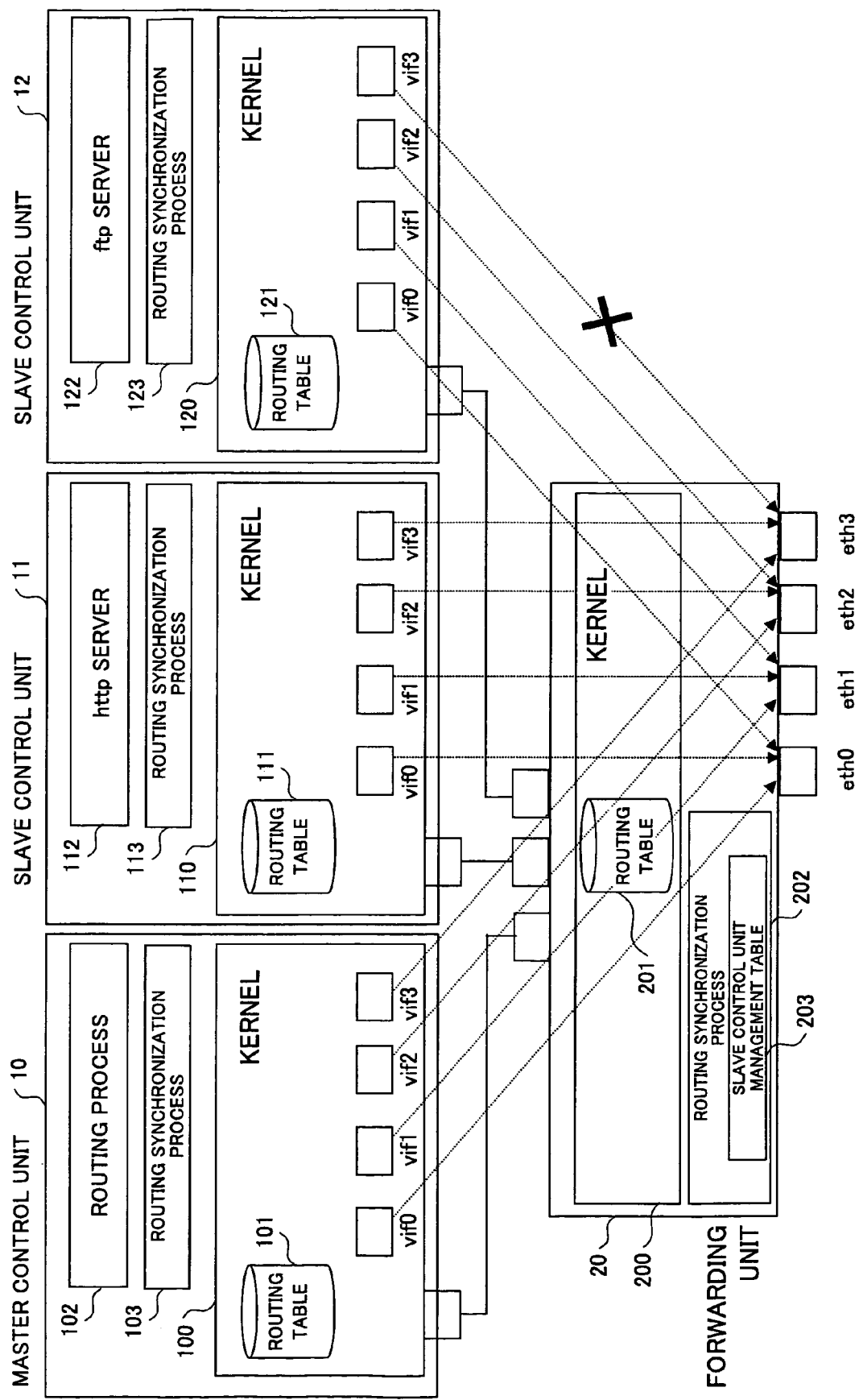

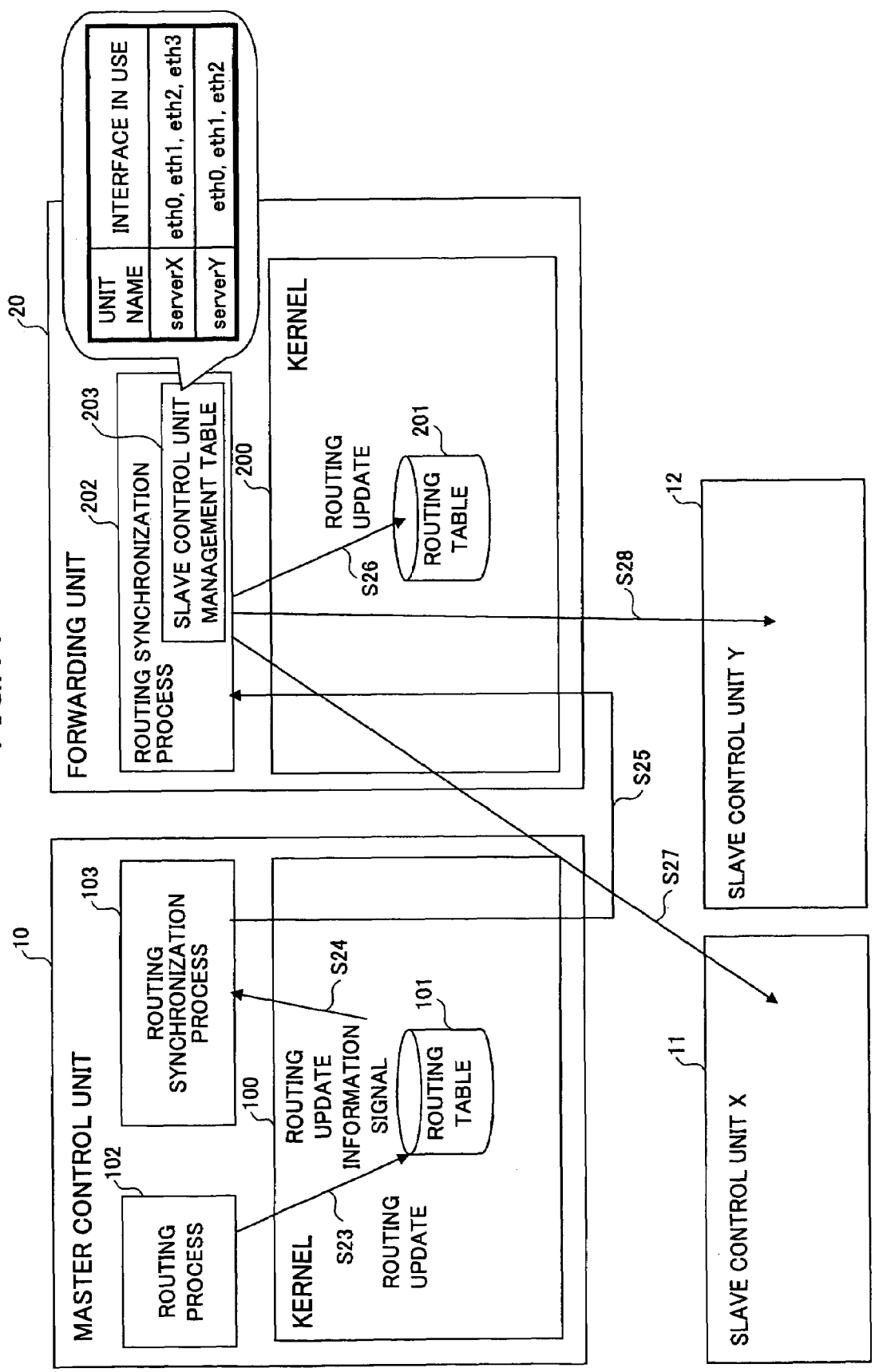

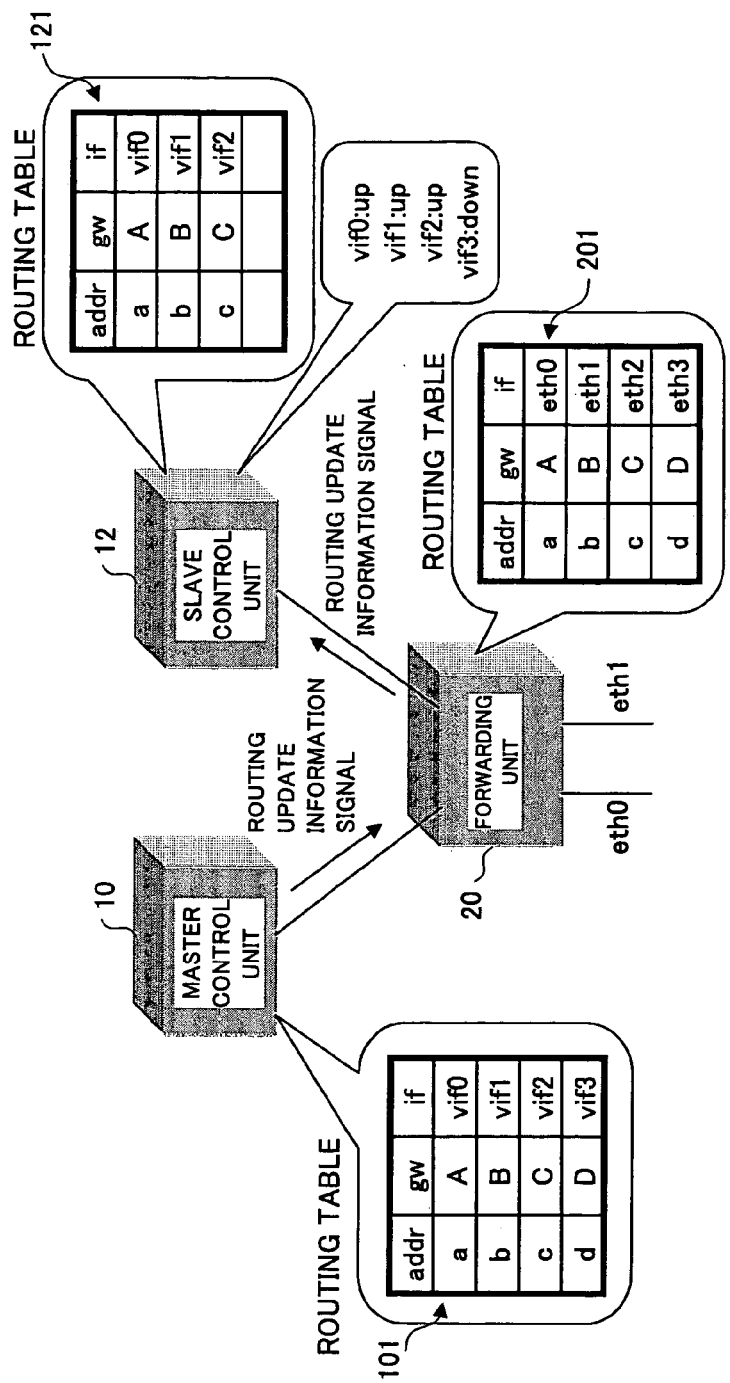
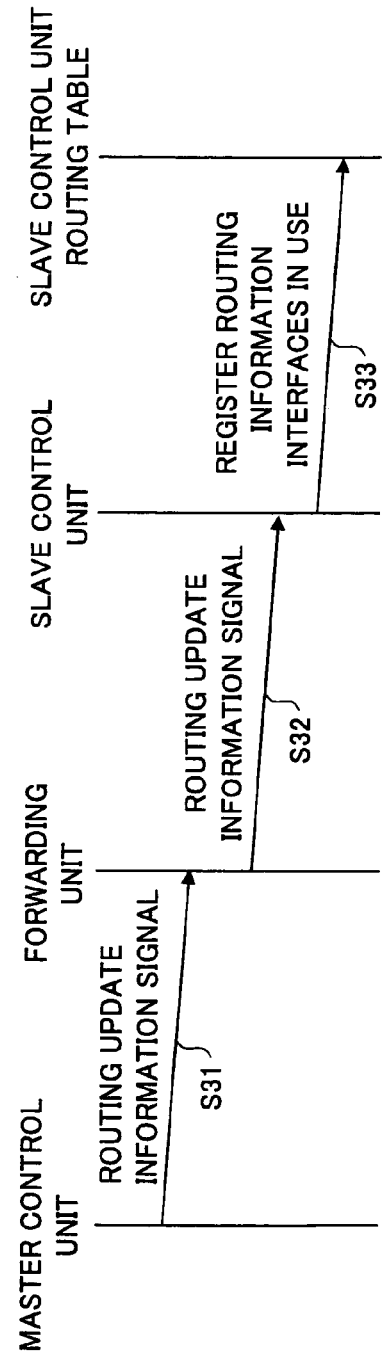
FIG.12A
FIG.12B

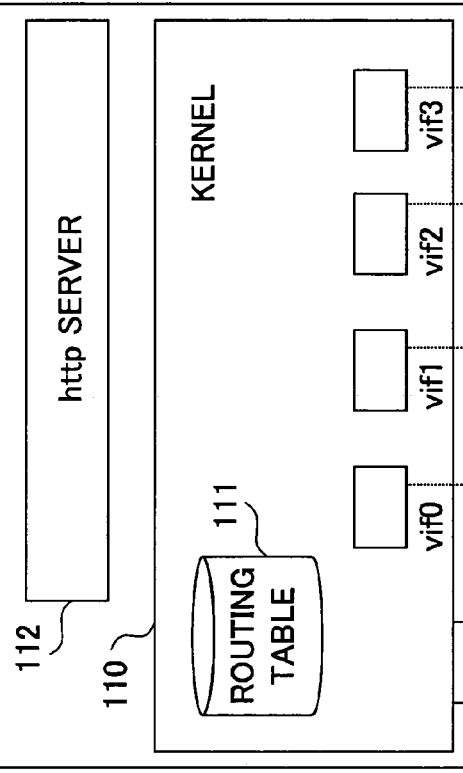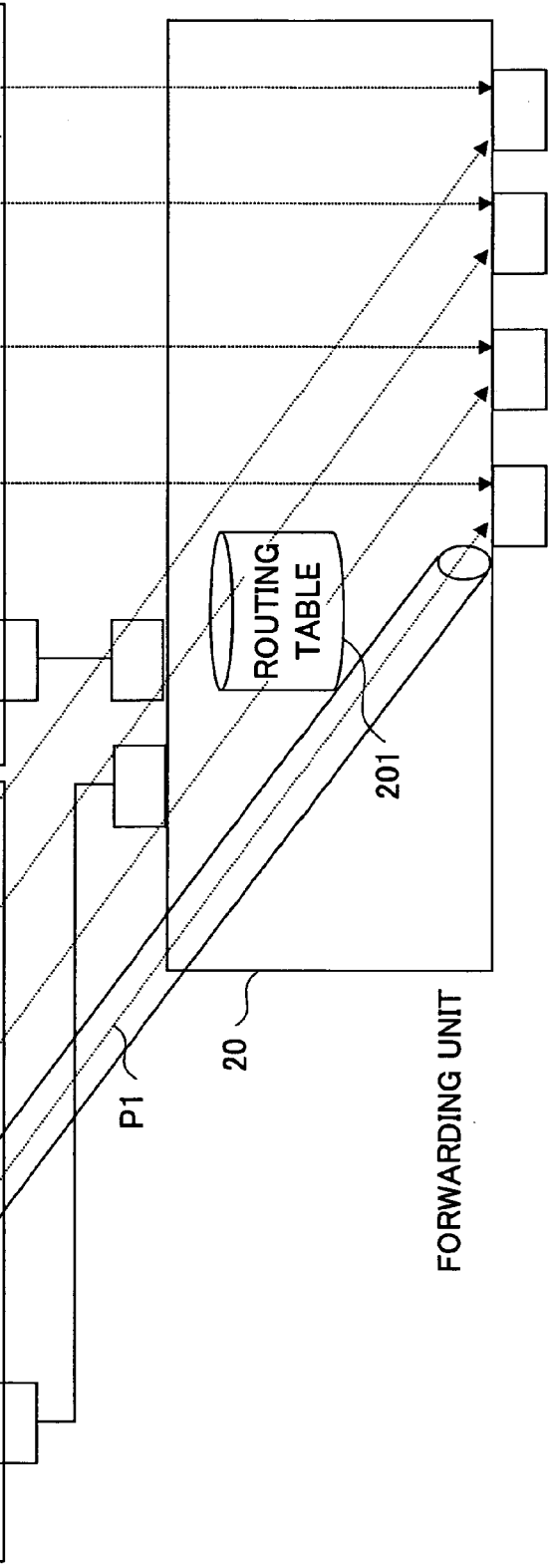
FIG.15

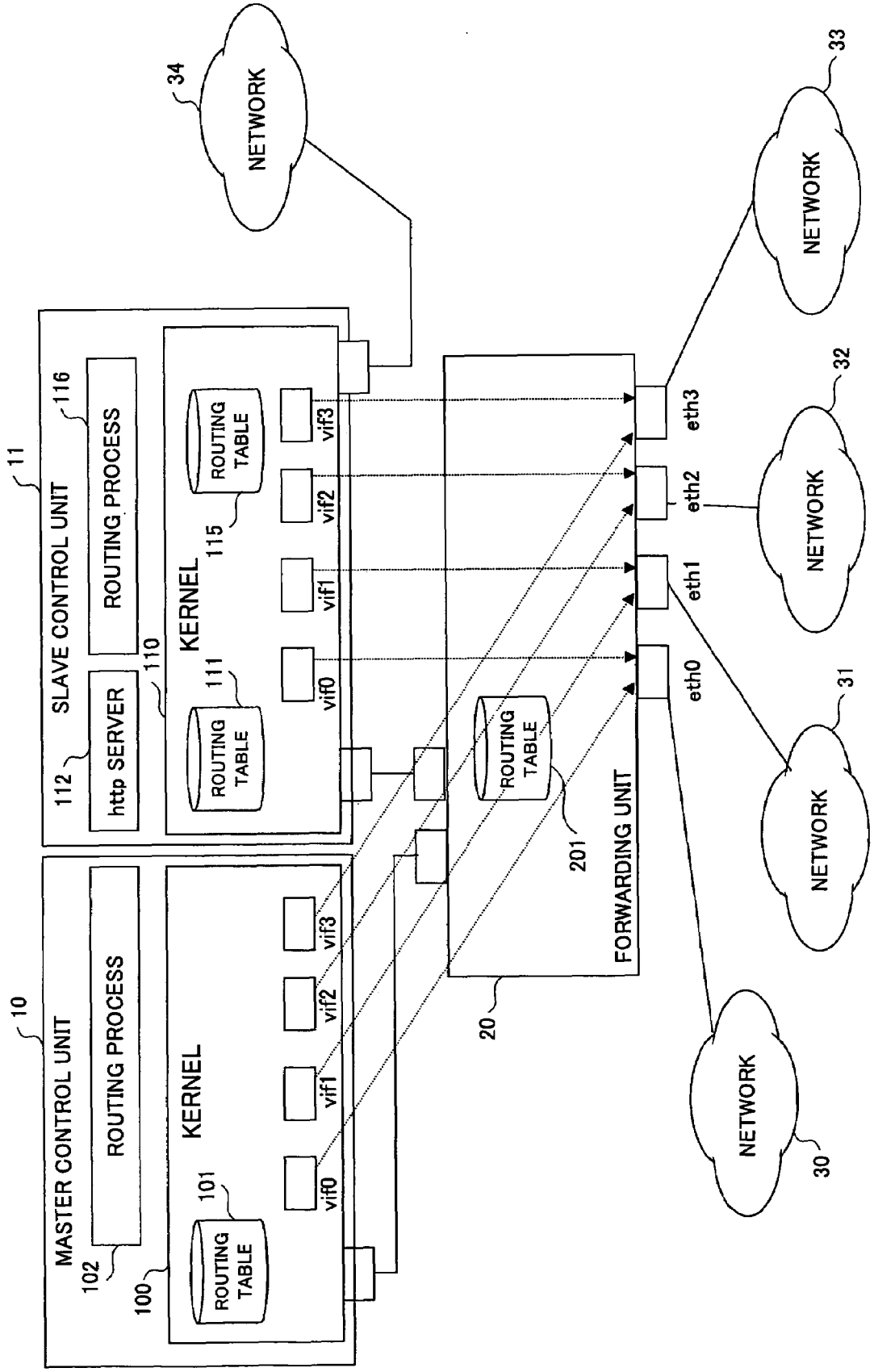

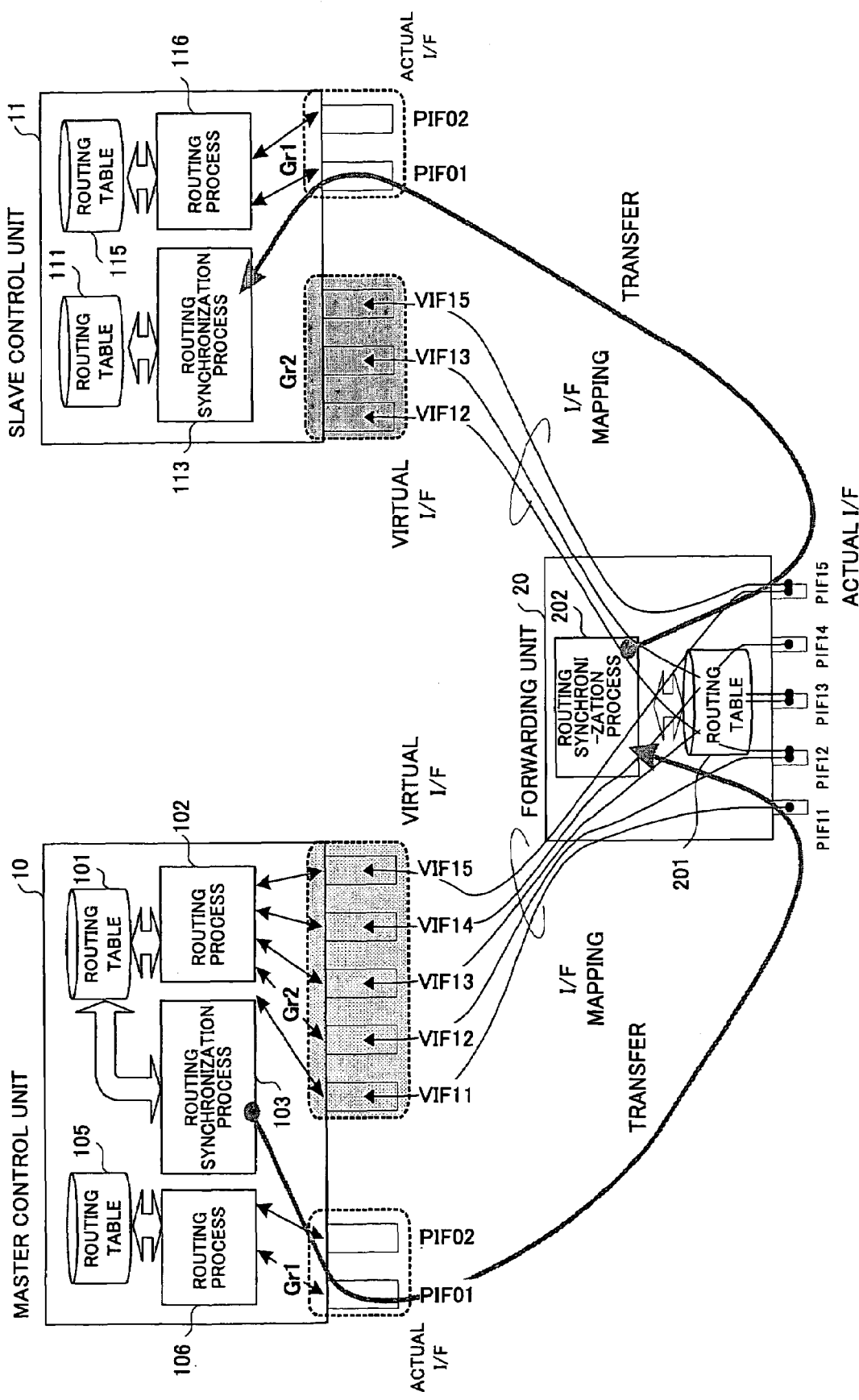

ROUTING TABLE SYNCHRONIZATION METHOD, NETWORK APPARATUS, AND ROUTING TABLE SYNCHRONIZATION PROGRAM

BACKGROUND OF THE INVENTION

1. Field of the Invention

The present invention relates to a network apparatus and a routing table synchronization technique for realizing a network system such as the Internet or an intranet system, for example.

2. Description of the Related Art

Generally, a network apparatus that handles packets includes a processor part as a control unit. Upon upgrading control performance and introducing a new network application to the apparatus, for example, a deficiency in resources of the processor and the memory becomes an obstacle. As examples of such network application, a routing daemon for realizing a routing calculation, an ftp server for realizing a file transfer service, and/or an http server for providing hypertext information may be implemented.

To counter the above described obstacle, an application operating on such a network apparatus may be arranged so that the application appears to be operating on the main apparatus when viewed from the outside, but is actually operating on a separate server or some other unit (proxy execution of the application). In this way, desired additional processing capabilities may be appropriately provided to the apparatus.

Also, instead of realizing proxy execution of an application, the above problem may be countered by dividing the network apparatus into separate execution apparatuses depending on the various types of services that are provided by the applications of the network apparatus. However, for an application such as the routing daemon that realizes its designated operation by operating on the network apparatus itself, it is difficult to execute the application on a separate apparatus without making additional arrangements. Also, generally, in an IP network, providing various services at the same host address is more convenient for a user since the user may be able to remember the connection destination more easily, and management of the system as a service-providing scheme may be easier as well.

The inventor of the present invention has previously conceived a technique for arranging an application operating on a network apparatus to appear as though it is operating on the main apparatus while it is actually operating on a separate server or some other unit.

According to this technique, a virtual interface that corresponds to an actual interface of the main apparatus (forwarding unit) is provided in an external apparatus (control unit) that is provided separately from the main apparatus, and the external apparatus is arranged to transmit/receive an application that is subject to proxy execution via the virtual interface. In this way, the application may appear as if it is operating on the main part of the apparatus.

Further, in the case of executing plural applications, a technique of assigning a different connection identifier (port number) to each application in establishing communication may be used to provide a separate control unit for executing each application process. As a consequence, while a user may logically perceive the network apparatus as one single apparatus from the outside, by providing separate units for executing the various applications of the network apparatus, scalability in processing performance may be obtained. Also, according to this method, connection may be established/cut dynamically according to the execution start/end of a communication process in an application.

In a case where the control unit for executing each of the various application processes of the network apparatus is provided with plural virtual interfaces, a routing table is used to determine the interface to which a packet is to be transmitted upon sending the packet to a communication counterpart. That is, when a process of an application operating within a control unit is to establish communications with an external apparatus, the routing table is referred to in a process of determining the interface to which connection is to be made. Specifically, a process operating on a control unit designates an IP address as a connection destination upon establishing communications with an external apparatus (communication counterpart apparatus). Accordingly, in order to determine the interface to which the communication counterpart apparatus having the designated destination IP address is connected and/or the virtual interface to which connection is to be established, a correspondence table indicating the correspondence between the destination IP address and the virtual interface to which data are to be transmitted is desired. Such a table corresponds to a routing table. It is noted that a routing table is locally provided in each control unit that implements a process that involves establishing communications with an external apparatus.

In this case, the virtual interfaces of each control unit logically function in the same manner as the corresponding actual interfaces of the forwarding unit that is used as a base point for packet transmission/reception with an external apparatus. Thereby, the routing tables pertaining to the virtual interfaces have to be substantially identical to those of their corresponding actual interfaces.

In the case of statically setting a route through a static routing process, the contents of the routing table in each control unit implementing virtual interfaces may be arranged to correspond to the routing table of the forwarding unit. On the other hand, in the case of dynamically setting a route through a dynamic routing process, the routing tables of the control units and the forwarding unit have to be matched somehow.

Generally, a dynamic routing process generates a routing table using a routing protocol to exchange routing information with surrounding routers. However, when plural control units exist within a network apparatus and a routing protocol process is executed in each of the units, it may appear from the outside as though plural routing protocol processes are operating within a single unit so that the routing protocol processes may end up interfering with each other to thereby prevent proper operation.

Also, it is noted that executing a routing protocol process program in each of the plural control units may be inconvenient in that such an arrangement may be an obstacle to improving the processor performance, which is the object for dividing up the execution of the various applications in the first place.

To solve the above problem, the routing protocol process program may be redesigned entirely to realize a function of matching the routing tables; however, the process sequence of such a program may be very complicated since the routing tables of physically separate control units have to be managed as a single operating unit. Processing may be particularly complicated when an error occurs in the process sequence.

SUMMARY OF THE INVENTION

The present invention has been conceived in response to the one or more problems of the related art, and its object is to provide a network arrangement implementing a virtual interface scheme to execute various application processes using plural control units in which arrangement routing tables of the control units are synchronized, and routing information for an actual interface and a routing table of each control unit including a virtual interface corresponding to this actual interface are synchronized without having to execute a complicated process sequence.

Specifically, it is one object of the present invention to provide a routing table synchronization method that is used in a network apparatus including a forwarding unit corresponding to a base point for conducting packet transmission/reception with an external network, and a plurality of control units for operating a plurality of applications that are arranged to access virtual interfaces of the control units that correspond to actual interfaces of the forwarding unit so that the network apparatus appears from the outside to be functioning as a single unit, the routing table synchronization method including the steps of:

executing a routing process of generating a routing table at a master control unit corresponding to one of the control units;

updating a routing table of the forwarding unit by a routing synchronization process that operates independently from the routing process if the routing table of the master control unit is updated; and updating one or more routing tables of one or more slave control units corresponding to the control units other than the master control unit through the forwarding unit.

It is another specific object of the present invention to provide a network apparatus that realizes packet transmission/reception with an external network using a forwarding unit as a base point and operation of a plurality of applications using a plurality of control units, the applications being arranged to access virtual interfaces of the control units corresponding to actual interfaces of the forwarding unit so that the network apparatus appears from the outside to be functioning as a single unit, the network apparatus including:

a routing part that is included in a master control unit corresponding to one of the control units, and is adapted to generate a routing table that indicates an interface to which a packet is to be transmitted;

a first routing synchronization part that is included in the master control unit and operates independently from the routing part, the first routing synchronization part being adapted to receive a signal from a kernel of the master control unit indicating that the routing table of the master control unit is updated, and transmit routing information pertaining to the updating to the forwarding unit in response to the received signal;

a second routing synchronization part that is included in the forwarding unit and is adapted to receive the routing information from the first routing synchronization part and update a routing table of the forwarding unit based on the received routing information and transmit the routing information to one or more slave control units corresponding to the control units other than the master control unit; and one or more third routing synchronization parts that are included in the one or more slave control units, and are adapted to receive the routing information from the second routing synchronization part and update one or more routing tables of the one or more slave control units based on the received routing information.

It is another specific object of the present invention to provide a routing table synchronization program that is run on a network apparatus including a forwarding unit corresponding to a base point for conducting packet transmission/reception with an external network, and a plurality of control units for operating a plurality of applications that are arranged to access virtual interfaces of the control units that correspond to actual interfaces of the forwarding unit so that the network apparatus appears to be functioning as a single unit as viewed from the outside, the routing table synchronization program including functions of:

executing a routing process of generating a routing table at a master control unit corresponding to one of the control units;

updating a routing table of the forwarding unit if the routing table of the master control unit is updated; and updating one or more routing tables of one or more slave control units corresponding to the control units other than the master control unit in response to the updating of the routing table of the forwarding unit;

wherein the functions of updating the routing tables of the forwarding unit and the one or more slave control units are executed independently from the routing process.

According to an aspect of the present invention, routing tables of units included in a network apparatus may be synchronized by an autonomous decentralized scheme using a routing synchronization process that is independent from a process of generating a routing table so that the routing table generating process does not have to be altered and synchronization of the routing tables may be realized without having to execute a complicated process sequence.

In a preferred embodiment of the present invention, the forwarding unit is arranged to:

refrain from transmitting routing information pertaining to a virtual interface to a slave control unit that implements this virtual interface if this virtual interface is down;

transmit a signal to a slave control unit to delete routing information pertaining to a virtual interface from a routing table of the slave control unit if it is determined that an operating state of this virtual interface is switched from an up state to a down state; and transmit routing information pertaining to a virtual interface to a slave control unit that implements this virtual interface if it is determined that an operation state of this virtual interface is switched from a down state to an up state.

According to an aspect of the present invention, routing information pertaining to a virtual interface that is down may be withheld from a routing table of a control unit including this down virtual interface, and occurrence of an error state due to an inability to transmit a packet may be prevented.

In an alternative embodiment of the present invention, the slave control may be adapted to:

refrain from registering routing information from the forwarding unit pertaining to a virtual interface into its routing table if this virtual interface is down;

delete routing information pertaining to a virtual interface from its routing table if it is determined that an operating state of this virtual interface is switched from an up state to a down state; and register routing information pertaining to a virtual interface into its routing table if it is determined that an operation state of this virtual interface is switched from a down state to an up state.

In another preferred embodiment of the present invention, a signal is transmitted to one of the slave control units to activate a new routing process if it is determined that the routing process of the master control unit no longer operates properly, and a destination of a routing packet that is originally directed to the master control unit is switched to the slave control unit at which the new routing process is activated if it is determined that the new routing process is operating properly at this slave control unit.

According to an aspect of the present invention, redundancy may be provided in a routing process, and security may be provided with respect to an abnormal end of a routing process.

BRIEF DESCRIPTION OF THE DRAWINGS

FIG. 1 is a block diagram showing the flow of a packet within a single unit;

FIG. 2 is a table illustrating an example of a routing table;

FIG. 7 is a block diagram showing the flow of updating routing information in the network apparatus according to the first embodiment;

FIG. 8 is a block diagram showing a configuration of a network apparatus according to a second embodiment of the present invention;

FIG. 9 is a block diagram illustrating an exemplary correspondence between virtual interfaces and actual interfaces of the network apparatus of FIG. 8;

FIG. 11 is a block diagram showing the flow of updating routing information in the network apparatus according to the second embodiment;

FIGS. 12A and 12B are diagram illustrating another exemplary operation of a network apparatus according to a third embodiment of the present invention;

FIG. 15 is a block diagram illustrating a first exemplary operation of the network apparatus according to the fourth embodiment;

FIG. 18 is a block diagram showing a configuration of a network apparatus according to another embodiment in which a control unit implements an independent routing process; and FIG. 19 is a block diagram illustrating an exemplary grouping of interfaces of a network apparatus.

DESCRIPTION OF THE PREFERRED EMBODIMENTS

In the following, preferred embodiments of the present invention are described with reference to the accompanying drawings.

First, a basic function of a routing table and proxy execution of an application using a virtual interface are described.

FIG. 1 shows the flow of a packet within a single unit. In FIG. 1, when a packet having a designated destination IP address is transmitted to kernel B from process A corresponding to an application execution format (step S1), the kernel B refers to a routing table C to determine the interface corresponding to the destination IP address and transmits the packet to the corresponding interface (step 2). The routing table C is a table containing information indicating the interface to which a destination network is connected and information indicating a forwarding router (next hop) to which a packet is to be transmitted.

FIG. 2 shows an exemplary configuration of the routing table C. In FIG. 2, the routing table C includes a "Destination" field indicating the IP address of a destination network, a "Gateway" field indicating a next forwarding router (next hop), a "Genmask" field indicating a mask, a "Flags" field, a "Metric" field, a "Ref" field, and a "Use" field indicating various types of flags, and an "Iface" field indicating an interface. For example, in the case of default routing, the next hop is indicated as 10.25.165.1, and the interface is indicated as eth0. It is noted that the exemplary routing table C shown in FIG. 2 may likely be provided in a terminal apparatus; in a router apparatus, tens of thousands of routing information entries such as that described above may be stored.

Figure 3:
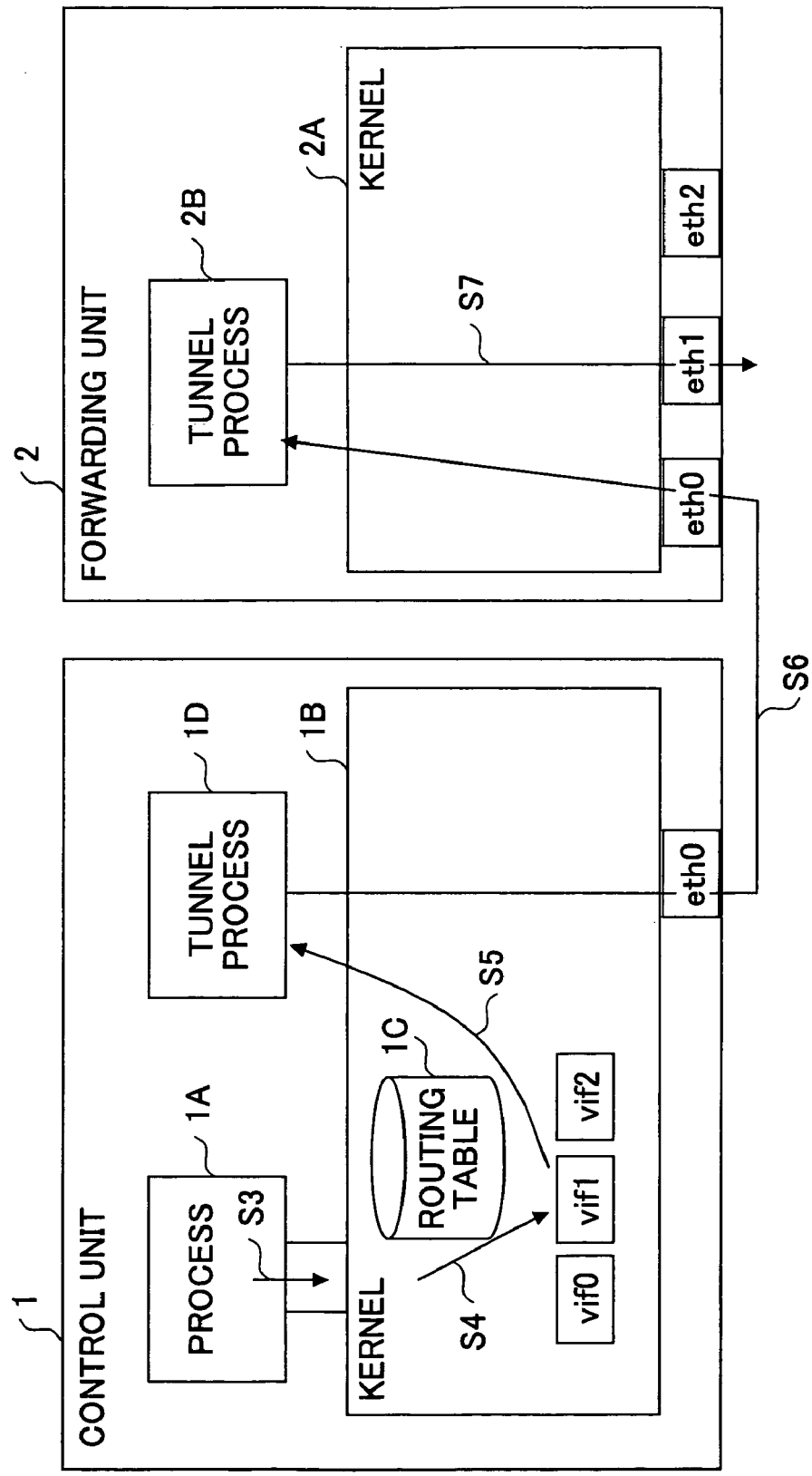
FIG. 3 is a block diagram showing the flow of a packet within a network apparatus implementing plural units and virtual interfaces.

FIG. 3 shows the flow of a packet within a network apparatus that is made up of plural units using virtual interfaces.

In FIG. 3, a control unit 1 conducts proxy execution of an application. A forwarding unit 2 functions as a base point apparatus for realizing packet transmission/reception with an external network. The forwarding unit 2 includes plural actual interfaces eth0~eth2, and is connected to the control unit 1 via one of its actual interfaces eth0. It is noted that, although only one control unit 1 is indicated in this example, plural control units 1 may be provided according to the number of applications that are to be operated through proxy execution, for example.

Normally, the interface that may be perceived from the application operating at the control unit 1 corresponds to an actual interface of the control unit 1. Accordingly, if plural control units 1 are provided, it can be perceived from the outside as though plural control units 1 may be accessed. This in turn means that a server to be accessed from outside differs depending on the application to be accessed, and access has to be made to different IP addresses depending on the different control units. In contrast, according to the present embodiment, access may be made to an IP address of the forwarding unit 2 from outside, and the plural control units 1 may be internally accessed therefrom. In order to enable internal access to the plural control units 1, virtual interfaces vif0~vif2 each corresponding to a type of device driver are provided within a kernel 1B of the control unit 1. It is noted that the number of virtual interfaces being provided is not limited to the present example, and any number of virtual interfaces may be provided.

In the example of FIG. 3, when a packet having a designated destination IP address is transmitted to kernel 1B from a process 1A corresponding to an execution format of an application (step S3), the kernel 1B refers to a routing table 1C to determine a virtual interface corresponding to the destination IP address, and writes the packet in the corresponding virtual interface (step S4).

Then, a tunnel process 1D reads the packet written in the virtual interface (step S5), and transmits the packet to the forwarding unit 2 via the actual interface eth0 (step S6). It is noted that the tunnel process 1D assigns a number (tunnel ID) identifying the corresponding virtual interface in a data header of the packet upon transmitting the packet to the forwarding unit 2. As is illustrated, according to the present embodiment, the kernel 1B of the control unit 1 does not directly send the packet written in the virtual interface via its actual interface eth0; rather, a dedicated tunnel process 1D is used to read the packet and transmit this packet via the actual interface eth0.

At the forwarding unit 2, tunnel process 2B receives the packet from the control unit 1 via the kernel 2A, the tunnel process 2B determines the actual interface to which the packet is to be transmitted based on the virtual interface number assigned to the header of the received packet, and transmits the packet to an external network via this actual interface (step S7). It is noted that the communication path formed between the tunnel process 1D of the control unit 1 and the tunnel process 2B of the forwarding unit 2 is called a tunnel.

When the forwarding unit 2 receives a packet from an external network, the forwarding unit 2 identifies the destination port number of the packet and determines the control unit 1 to which the packet is to be transmitted. That is, the forwarding unit 2 determines the tunnel to which the packet is to be allocated depending on the destination port number, and transmits the packet to the control unit 1 through this tunnel. The packet transmitted to the control unit 1 is received at the tunnel process 1D that terminates the tunnel. The tunnel process 1D writes the packet in a corresponding virtual interface, and the process 1A corresponding to the end of the communication process receives the packet from the virtual interface.

According to the flow described above, the process 1A operating on the control unit 1 may access the virtual interface and appear as though it is gaining direct access to the actual interface of the forwarding unit 2.

Figure 4:
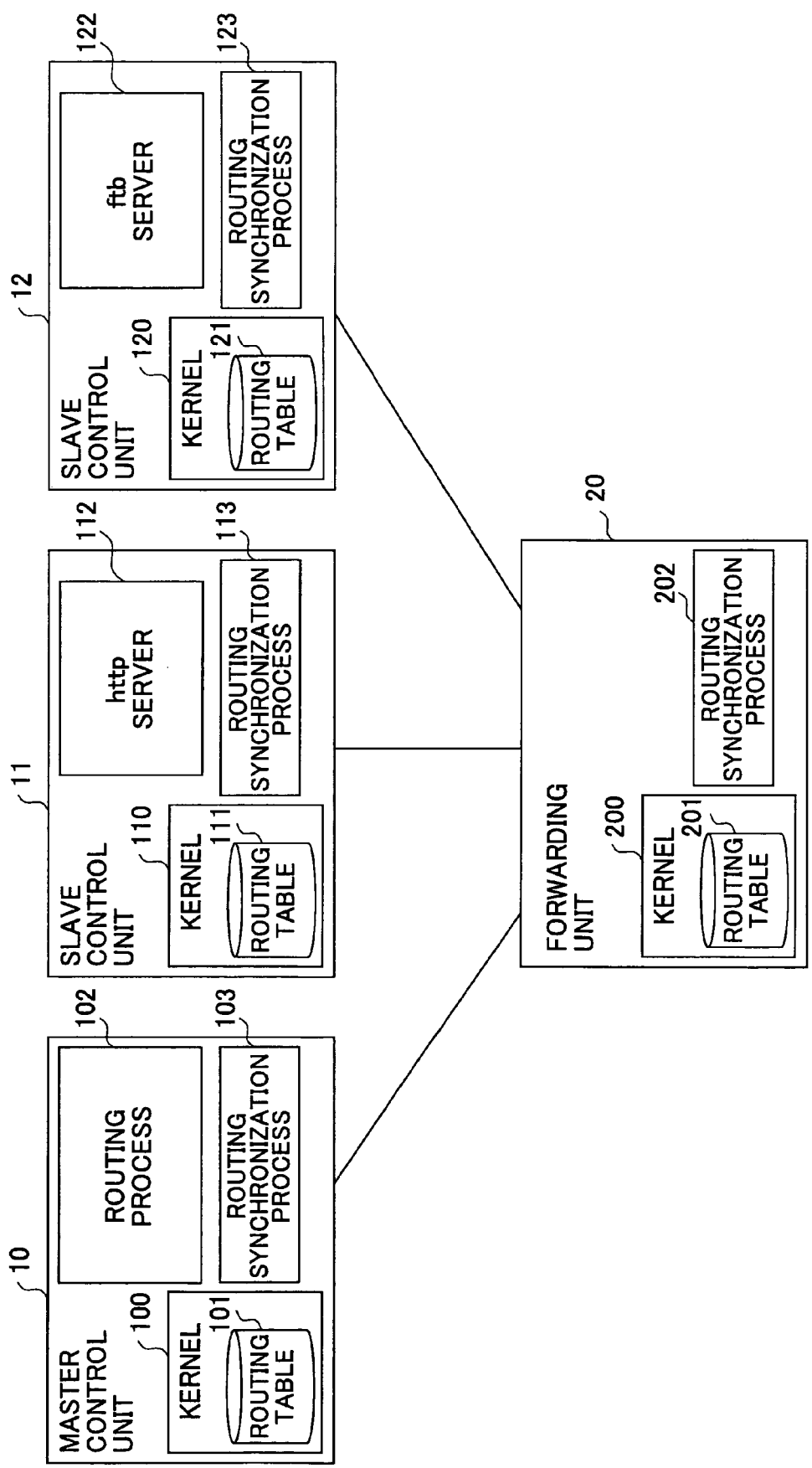
FIG. 4 is a block diagram showing a configuration of a network apparatus according to a first embodiment of the present invention.

FIG. 4 is a block diagram illustrating a network apparatus according to a first embodiment of the present invention.

The network apparatus of FIG. 4 includes plural control units 10~12 that conduct proxy execution of various applications. The control units 10~12 are connected to a forwarding unit 20 corresponding to a base point for realizing packet transmission/reception with an external network. It is further noted that one of the plural control units 10~12, corresponds to a master control unit 10 that generates routing information, and the other control units correspond to slave control units 11 and 12.

In the present example, the master control unit 10 includes a routing process 102 that generates routing information by communicating with surrounding routers via the forwarding unit 20. The slave control unit 11 includes an http server 112 as an exemplary application subject to proxy execution. The slave control unit 12 includes an ftp server as an exemplary application subject to proxy execution.

The control units 10~12 and the forwarding unit 20 respectively include kernels 100, 110, 120, and 200. In turn, the kernels 100, 110, 120, and 200 respectively include routing tables 101, 111, 121, and 201. Also, the apparatuses 10~12 and 20 respectively include routing synchronization processes 103, 113, 123, and 202 for synchronizing the routing tables.

Figure 5:
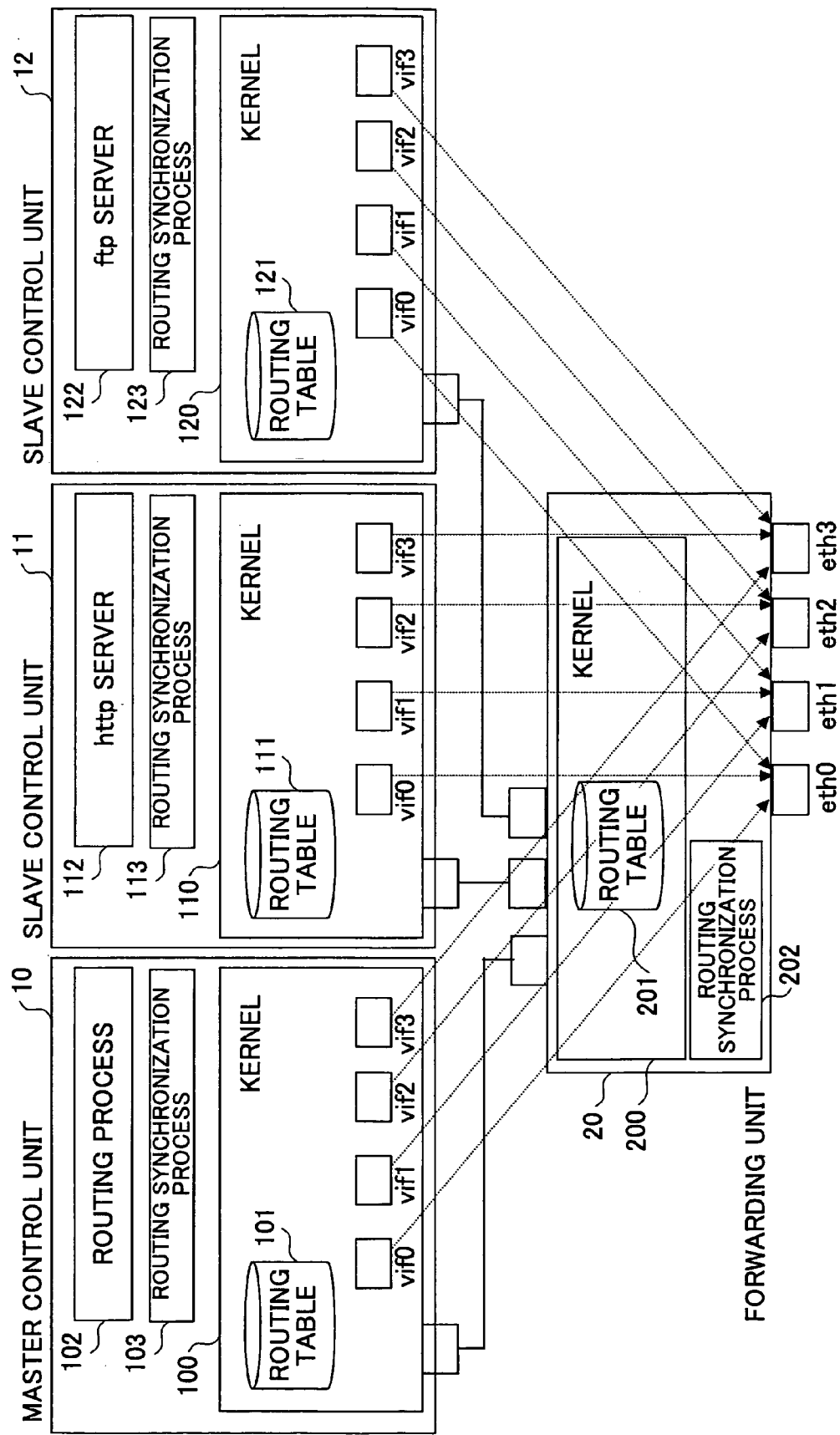
FIG. 5 is a block diagram illustrating an exemplary correspondence between virtual interfaces and actual interfaces of the network apparatus of FIG. 4.

FIG. 5 is a block diagram showing an exemplary correspondence between the virtual interfaces and the actual interfaces of the network apparatus of FIG. 4. In this example, virtual interfaces vif0, vif1, vif2, and vif3 provided in each of the kernels 100, 110, and 120 of the control units 10~12 are respectively arranged to correspond to actual interfaces eth0, eth1, eth2, and eth3 of the forwarding unit 20.

Figure 6A:
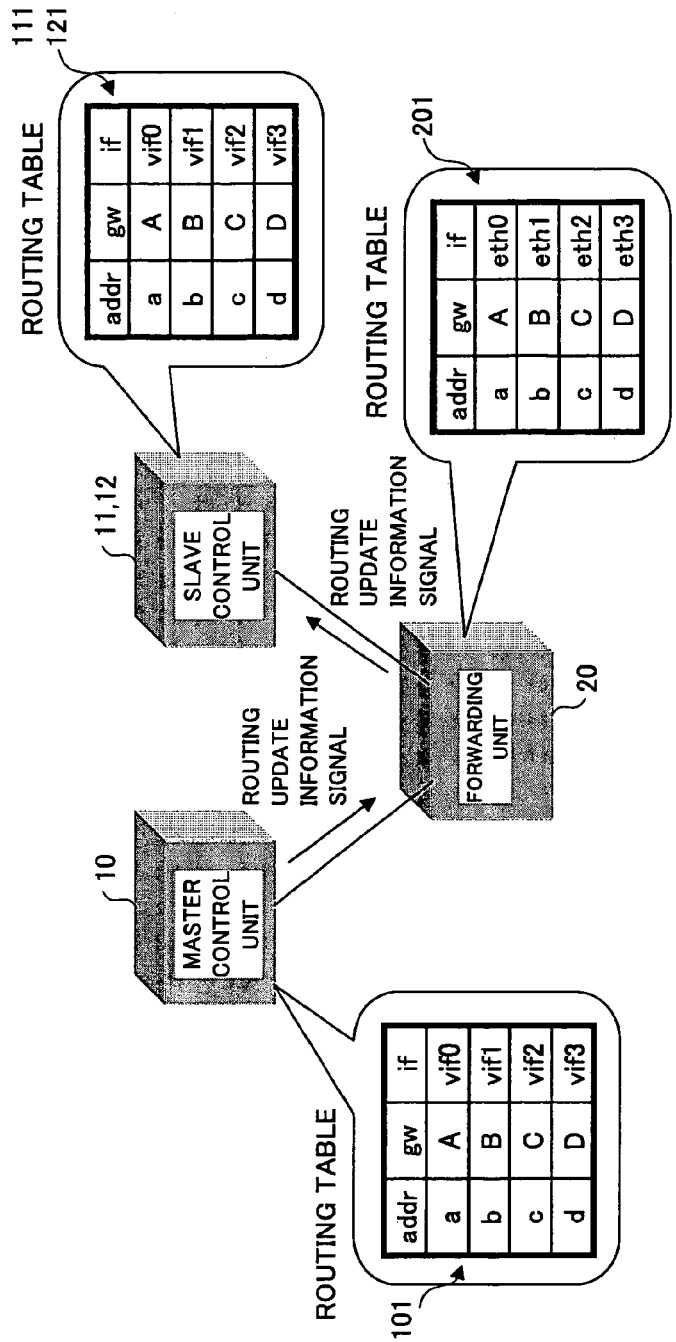
FIGS. 6A and 6B are diagrams illustrating an exemplary operation of the network apparatus according to the first embodiment.
Figure 6B:
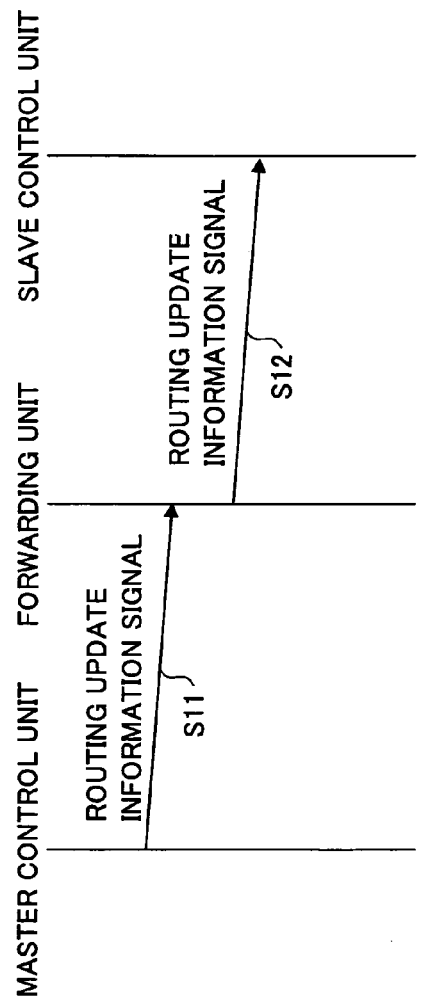

FIGS. 6A and 6B illustrate an exemplary operation of the network apparatus of the first embodiment shown in FIGS. 4 and 5.

In this example, the routing process 102 operating in the master control unit 10 exchanges routing information with an external network via a virtual interface, and updates routing information in the routing table 101 of the kernel 100 based on the results of the information exchange. In turn, the kernel 100 informs the routing synchronization process 103 of the routing information update. Upon receiving this information, the routing synchronization process 103 sends a routing information update information signal to the routing synchronization process 202 of the forwarding unit 20 (step S11). Upon receiving this signal, the routing synchronization process 202 of the forwarding unit 20 writes the routing information in the routing table 201 of the kernel 200 to synchronize the routing information between the master control unit 10 and the forwarding unit 20.

It is noted that the master control unit 10 and the forwarding unit 20 have substantially the same routing information; however since the interfaces that may be perceived from the master control unit 10 correspond to virtual interfaces, the master control unit 10 and the forwarding unit 20 contain different interface names in their respective routing information entries. Alteration of the interface names may take place upon updating the routing information at the routing synchronization process 202 of the forwarding unit 20. As a result of this alteration, for example, at the forwarding unit 20, a destination address A may be perceived as being accessible through the actual interface eth0, whereas at the master control unit 10, the same destination address A may be perceived as being accessible through the virtual interface vif0.

FIG. 7 illustrates in greater detail the process flow of updating the routing information from the master control unit 10 to the forwarding unit 20. According to this drawing, when the routing process 102 of the master control unit 10 updates the routing information of the routing table 101 of the kernel 100 (step S13), the kernel 100 of the master control unit 10 sends a routing information update information signal to the routing synchronization process 103 of the master control unit 10 (step S14). Then, the routing synchronization process 103 of the master control unit 10 includes the routing information in an IP packet and transmits the IP packet to the routing synchronization process 202 of the forwarding unit 20 that is subject to routing synchronization (step S15). Upon receiving the packet for synchronization, the routing synchronization process 202 of the forwarding unit 20 updates the routing table 201 of the kernel 200 (step S16).

Referring back to FIGS. 6A and 6B, it is noted that routing to a virtual interface is not determined at the slave control units 11 and 12, and instead, the slave control units 11 and 12 acquire routing information from the forwarding unit 20 that includes the actual interfaces corresponding to the virtual interfaces of the slave control units 11 and 12. That is, when the routing synchronization process 202 operating on the forwarding unit 20 receives a routing information update information signal from the routing synchronization process 103 of the master control unit 10, it updates its routing table 201 based on the received information as described above, and also transmits the routing information update information signal to the slave control units 11 and 12 having virtual interfaces that correspond to the actual interfaces of the forwarding unit 20 (step S12). The slave control units 11 and 12 receive the routing information update information signal from the forwarding unit 20 at their respective routing synchronization processes 113 and 123, and in turn, the routing synchronization processes 113 and 123 register/update their respective routing tables 111 and 121 containing routing information pertaining to their virtual interfaces.

According to the present embodiment, the routing table synchronization process as described above is conducted independently from the routing process, and this process is conducted between two apparatuses on a one-to-one basis in a closed environment so that the routing process for generating routing information may not interfere with the routing table synchronization process and operation may be enabled by a simple process sequence. For example, when an error occurs in the synchronization process, the error may be processed and dealt with between the two apparatuses, and complicated error processing may not be required.

FIG. 8 is a block diagram showing a configuration of a network apparatus according to a second embodiment of the present invention. According to the present embodiment, if one or more of the virtual interfaces corresponding to the actual interfaces of the forwarding unit are down (not open) at a slave control unit, the routing information pertaining to the down virtual interface is not provided to the slave apparatus. Routing information pertaining to a down interface is not desired in the slave control unit, and the presence of the routing information pertaining to the down interface within the slave control unit may even lead to problems. For example, if a packet is directed to a route connecting to a down interface that is written into a kernel, the kernel may be able to search the routing table and obtain information on the interface to which the packet is to be output, and thereby the kernel may receive the packet. As a result, the application may assume that the packet transmission has been successfully conducted even though in actuality, an error state is created as a result of transmission failure of the packet owing to the fact that the interface is down. In this aspect, the routing information pertaining to a down interface is preferably deleted from the routing table of the control unit.

In FIG. 8, the forwarding unit 20 has a routing synchronization process 202 that includes a slave control unit management table 203 for managing the interfaces that are in use at the slave apparatuses. The configuration of the network apparatus of FIG. 8 is identical to that of FIG. 4 except for the above feature.

According to the present embodiment, a routing synchronization process 202 of the forwarding unit 20, namely, a synchronization process that takes into account the up/down states of the virtual interfaces, may realize the following functions.

(1) When a state of a virtual interface of a control unit changes from a down state to an up state, transmitting the routing information pertaining to the virtual interface to the control unit.

(2) When a state of a virtual interface of a control unit changes from an up state to a down state, deleting the routing information pertaining to the virtual interface from the control unit.

(3) When a virtual interface of a control unit is in a down state, refraining from transmitting the routing information pertaining to the virtual interface to the control unit.

FIG. 9 shows an exemplary correspondence between the virtual interfaces and the actual interfaces of the network apparatus of FIG. 8. As is described above, the virtual interfaces vif0, vif1, vif2, and vif3 that are provided in each of the kernels 100, 110, and 120 of the control units 10~12 respectively correspond to the actual interfaces eth0, eth1, eth2, and eth3 of the forwarding unit 20. In the present example, it is assumed that the virtual interface vif3 (corresponding to the actual interface eth3) of the slave control unit 12 is down.

Figures 10A, 10B:
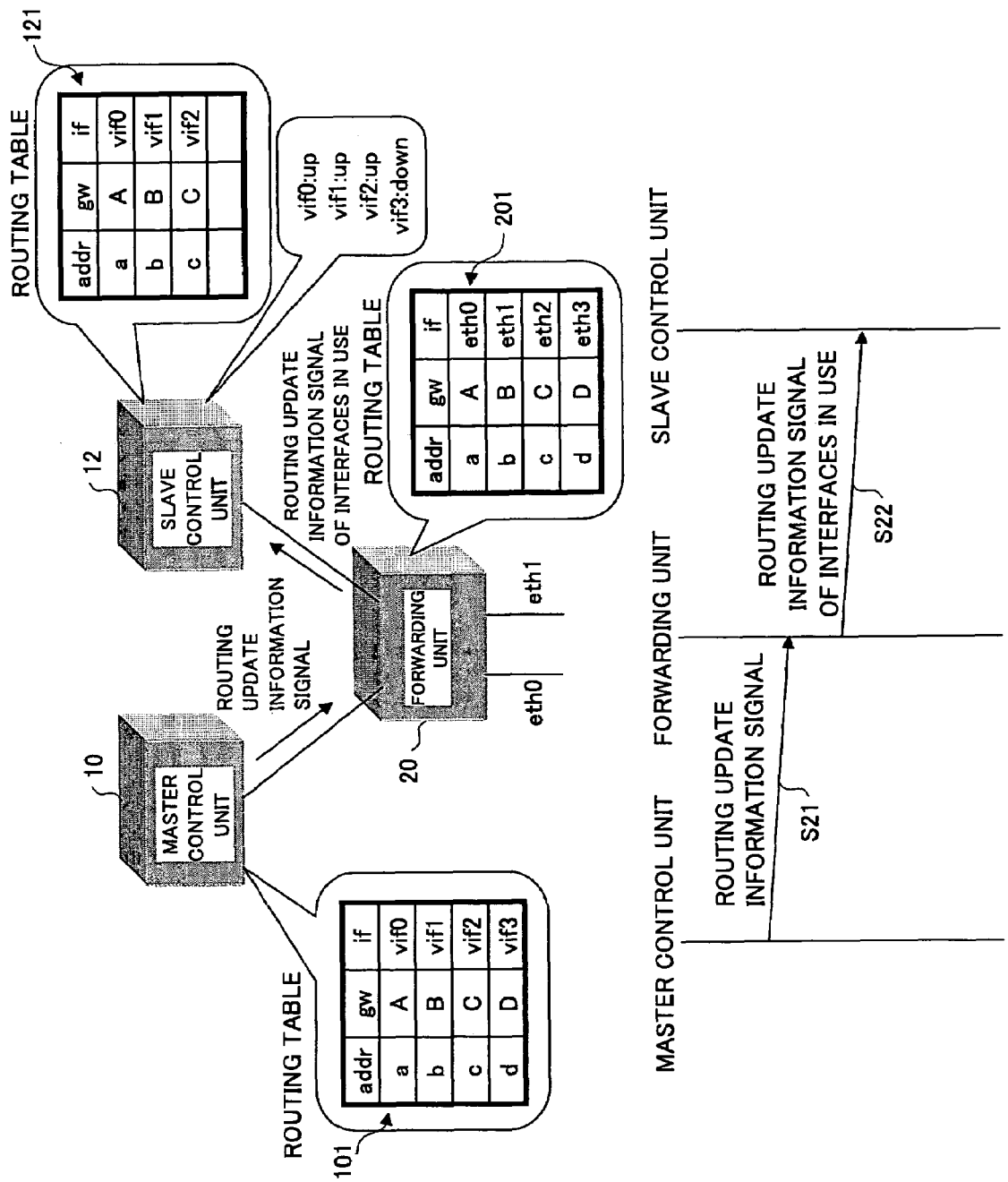
FIGS. 10A and 10B are diagrams illustrating an exemplary operation of the network apparatus according to the second embodiment.

FIGS. 10A and 10B illustrate an exemplary operation of the network apparatus according to the second embodiment shown in FIGS. 8 and 9.

In the example illustrated in FIGS. 10A and 10B, the routing process 102 operating on the master control unit 10 exchanges routing information with an external network, and updates routing information of the routing table 101 in the kernel 100 according to routing determined based on the information exchange. In turn, the kernel 100 informs the routing synchronization process 103 of the updating of the routing information. Upon receiving this information, the routing synchronization process 103 transmits a routing information update information signal indicating this information to the routing synchronization process 202 of the forwarding unit 20 (step S21). Upon receiving the signal, the routing synchronization process 202 of the forwarding unit 20 writes the routing information in the routing table 201 of the kernel 200, and in this way, routing synchronization may be realized between the master control unit 10 and the forwarding unit 20.

The routing synchronization process 202 of the forwarding unit 20 determines the virtual interfaces of the slave control units 11 and 12 that are in use by referring to the slave control unit management table 203, and transmits routing information for the interfaces that are not down (step S22). In this example, all the virtual interfaces of the slave control unit 11 are in use (up), and thereby routing information pertaining to all the interfaces may be transmitted to the slave control unit 11. As for the slave control unit 12, the virtual interface vif3 is down, and thereby, the routing information for the virtual interfaces other than the virtual interface vif3 is transmitted. The slave control units 11 and 12 receive routing information update information signals from the forwarding unit 20 via the routing synchronization processes 113 and 123 that are operating on the slave control units 11 and 12, respectively, and update/register the routing information for their respective virtual interfaces in the routing table 111 and 121.

It is noted that when the routing synchronization process 202 of the forwarding unit 20 detects that the state of a virtual interface of the slave control unit 11 and/or 12 has changed from a down state to an up state, it may transmit routing information for the corresponding virtual interface to the corresponding slave control unit even when it does not receive routing information from the master control unit 10. In turn, the corresponding slave control unit registers/updates its routing table based on the received routing information. On the other hand, when the routing synchronization process 202 detects that the state of a virtual interface has changed from an up state to a down state, it sends a signal to delete the routing information for the corresponding virtual interface to the corresponding slave control unit, and in turn, the corresponding slave control unit deletes the corresponding routing information from the routing table.

FIG. 11 shows in greater detail the process flow of the updating of the routing information. According to this example, when the routing process 102 of the master control unit 10 updates the routing information of the routing table 101 of the kernel 100 (step S23), the kernel 100 of the master control unit 10 informs the routing synchronization process 103 of the master control unit 10 of the updating of the routing information (step S24). Then, the routing synchronization process 103 of the master control unit 10 includes the routing information in an IP packet and sends this packet to a routing synchronization process 202 of the forwarding unit 20 that is subject to routing synchronization (step S25). Upon receiving the packet for synchronization, the routing synchronization process 202 of the forwarding unit 20 updates the routing table 201 of the kernel 200 (step S26). Then, the routing synchronization process 202 of the forwarding unit 20 refers to the slave control unit management table 203 to determine the virtual interfaces of the slave control units 11 and 12 that are presently in use, and transmits routing information for the virtual interfaces that are in use (step S27 and S28).

Figure 13:
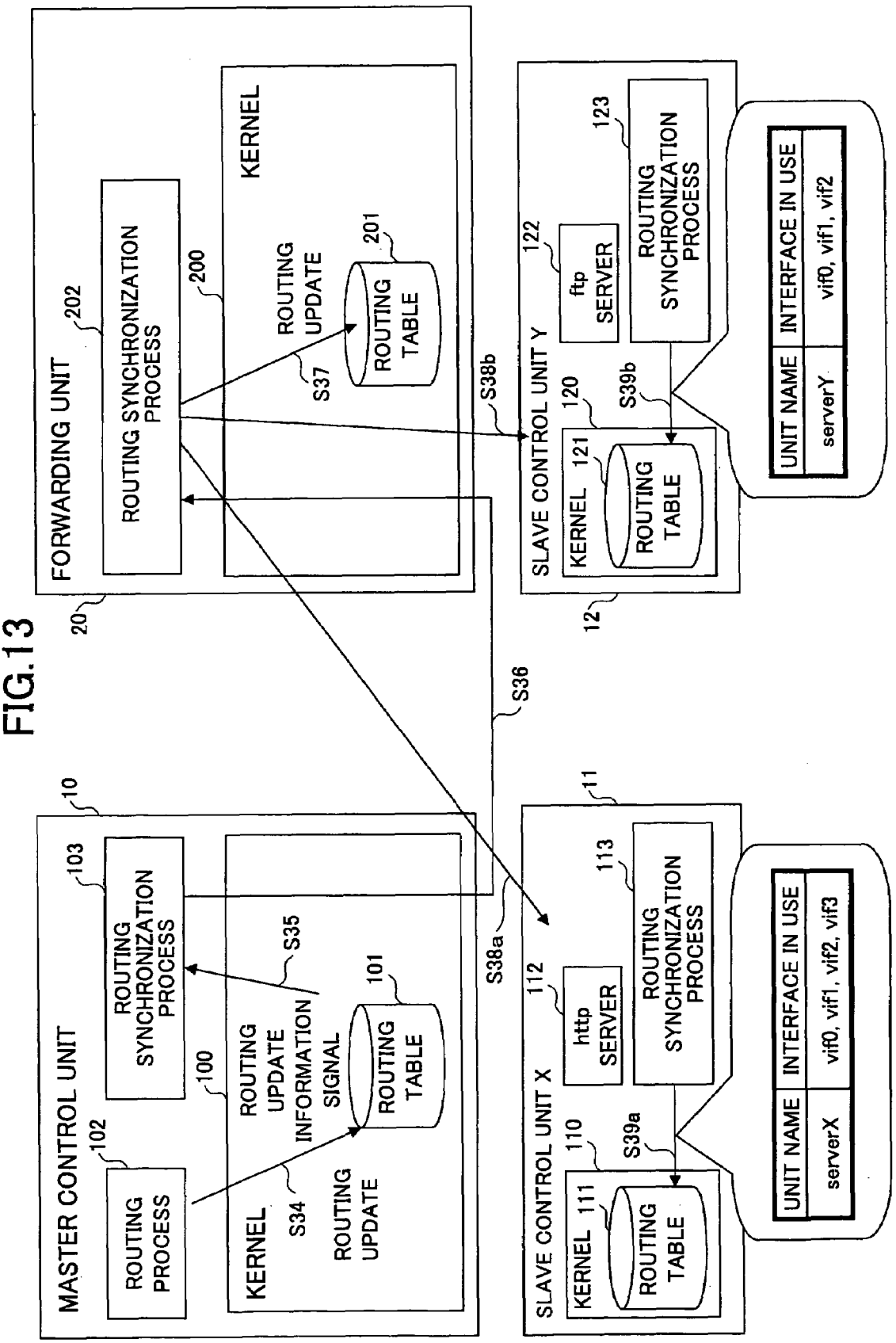
FIG. 13 is a block diagram illustrating the operation flow of updating routing information within a network apparatus according to the third embodiment.

FIGS. 12A, 12B, and FIG. 13 illustrate a third embodiment of the present invention as an alternative embodiment of the second embodiment taking into account the up/down state of the virtual interfaces. According to the present embodiment, in the case where a virtual interface is down, the routing synchronization process of the slave control unit manages the updating of its routing table instead of the slave control management table of the forwarding unit. Namely, the routing synchronization process of the slave unit receives routing update information of the virtual interface from the forwarding unit and manages to refrain from registering routing information of the down interface into its corresponding routing table.

Referring to the exemplary setup of the network apparatus as shown in FIG. 9 in which the virtual interface vif3 (corresponding to the actual interface eth3) of the slave control unit is down, according to the present embodiment as is shown in FIGS. 12A and 12B, for example, the master control unit sends the routing update information according to the procedures described above (step S31), and in turn, the routing synchronization process of the forwarding unit sends this routing update information to the slave control unit 12 regardless of the up/down states of the virtual interfaces (step S32).

The routing synchronization process of the slave unit 12 receiving this routing update information registers the routing information of the virtual interface that are up in the routing table of the kernel, but refrains from registering the routing information of the virtual interfaces that are down and instead enters this information in a table within a user space that the routing synchronization process possesses (step S33).

In a case where the virtual interface changes its state from a down state to an up state, the routing synchronization process of the slave control unit registers the information entry in the table within the user space corresponding to this virtual interface to the routing table of the kernel.

In a case where the virtual interface changes its state from an up state to a down state, the routing synchronization process of the slave control unit deletes the routing information corresponding to this virtual interface from the routing table of the kernel.

FIG. 13 shows in greater detail the process flow of the updating of the routing information according to the present embodiment. In this example, when the routing process 102 of the master control unit 10 updates the routing information of the routing table 101 of the kernel 100 (step S34), the kernel 100 of the master control unit 10 informs the routing synchronization process 103 of the master control unit 10 of the updating of the routing information (step S35). Then, the routing synchronization process 103 of the master control unit 10 includes the routing information in an IP packet and sends this packet to a routing synchronization process 202 of the forwarding unit 20 that is subject to routing synchronization (step S36). Upon receiving the packet for synchronization, the routing synchronization process 202 of the forwarding unit 20 updates the routing table 201 of the kernel 200 (step S37). Then, the routing synchronization process 202 of the forwarding unit 20 transmits the routing update information to the slave control units 11 and 12 (steps S38a and S38b) Then, the respective routing synchronization processes 113 and 123 of the slave control apparatuses 11 and 12 determines the virtual interfaces that are currently in used, and registers the routing information of the virtual interfaces that are currently in use in their respective routing tables 111 and 121 (steps S39a and 39b).

Figure 14:
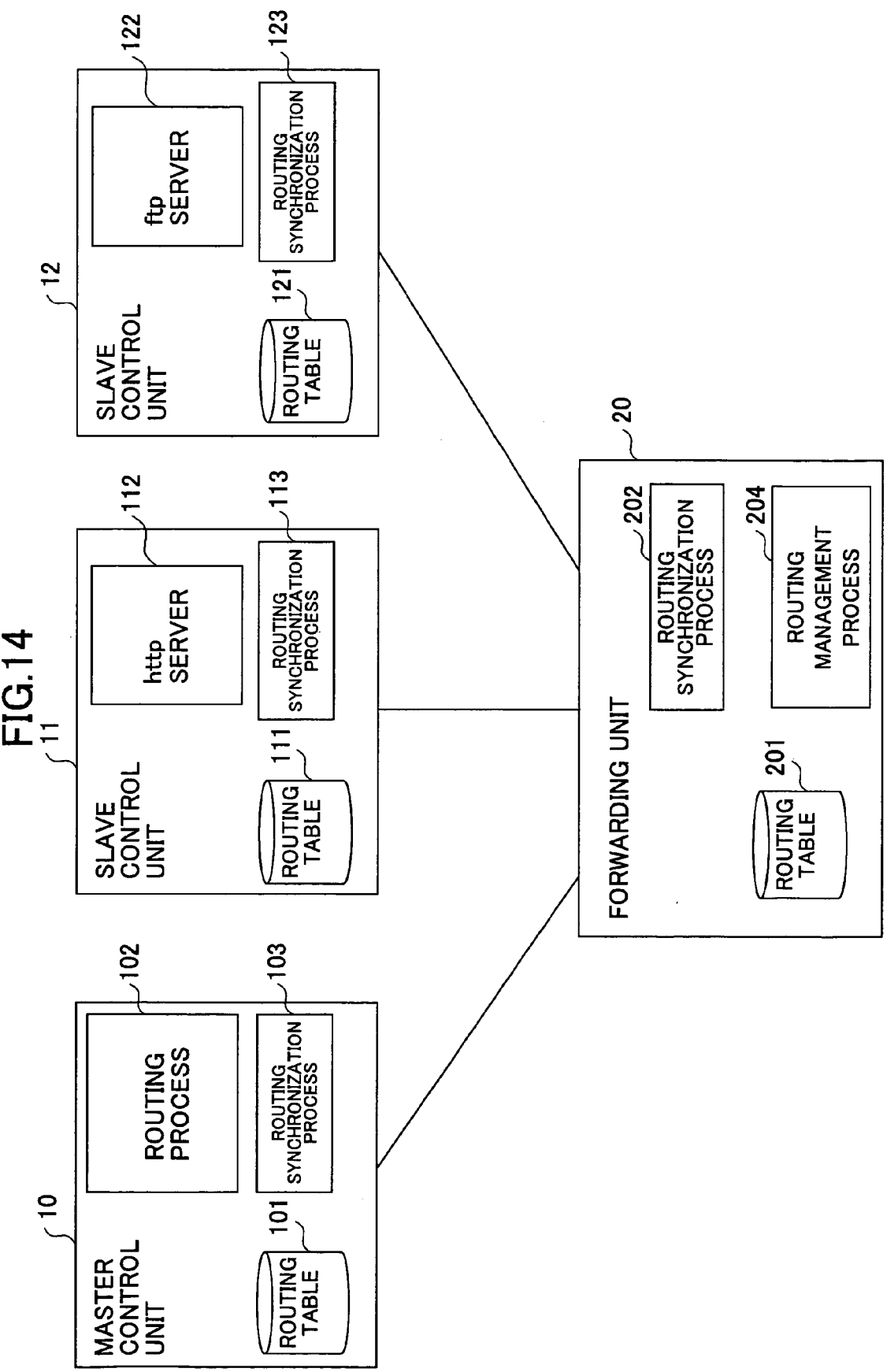
FIG. 14 is a block diagram showing a configuration of a network apparatus according to a fourth embodiment of the present invention.

FIG. 14 shows a configuration of a network apparatus according to a fourth embodiment of the present invention. In this embodiment, when the routing process of the master control unit fails to operate properly for some reason, a routing process for the virtual interfaces may be operated at one of the slave control units so that the corresponding slave control unit may operate as a new master control unit, and in this way redundancy may be secured in the routing process. In other words, when the routing process operating at the master control unit goes down due to some kind of trouble, communication with a routing process of an external network may be disabled so that the routing table cannot be updated. Accordingly, the present embodiment is arranged to counter such a problem.

In the example of FIG. 14, a routing management process 204 is provided in the forwarding unit 20. Upon detecting that communication with the routing process of the master control unit has been disabled, the routing management process 204 signals one of the slave control units to activate its routing process. Then, upon determining that the routing process has been properly activated, the routing management process 204 switches the destination of the routing protocol packet that is originally directed to the master control unit to the slave control unit at which the routing process is newly activated. It is noted that other features of the network apparatus shown in FIG. 14 are identical to those shown in FIGS. 4 and 8.

Figure 16:
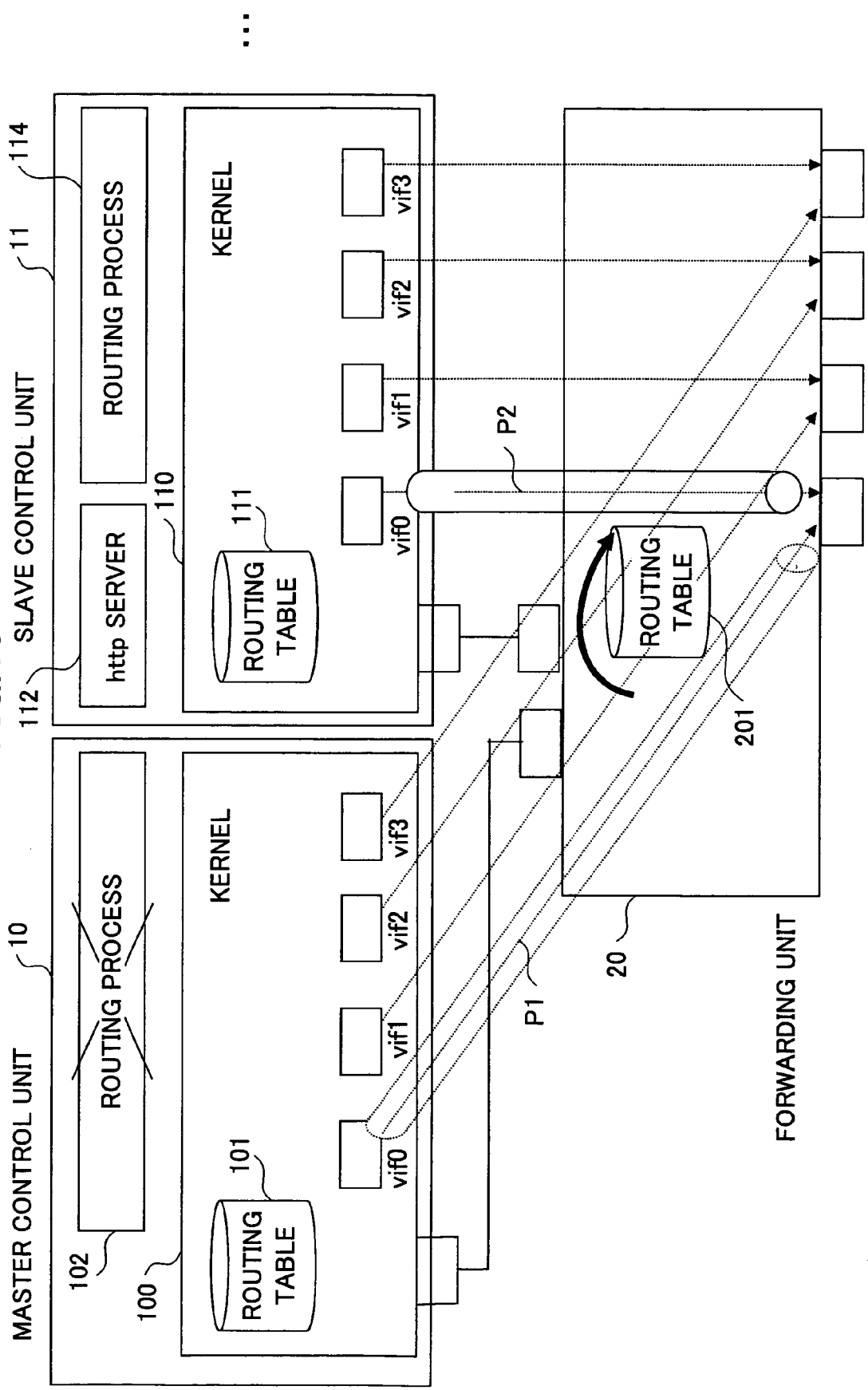
FIG. 16 is a block diagram illustrating a second exemplary operation of the network apparatus according to the fourth embodiment.

FIGS. 15 and 16 show exemplary operations of the network apparatus according to the fourth embodiment of the present invention.

Referring to FIG. 15, when the routing process 102 is properly operating, the routing process 102 may exchange routing information with an external router via route P1 using the virtual interface vif0 and update the routing table 101. However, when the forwarding unit 20 detects that the operation of the routing process 102 is disabled for some reason, for example, the routing management process 204 of the forwarding unit 20 activates a new routing process 114 at the slave control unit 11 and switches the route for exchanging routing information with an external router from route P1 to route P2 as is shown in FIG. 16. Hereafter, the master control unit 10 functions as a slave control unit, and the slave control unit 11 functions as a master control unit to realize the synchronization of the routing tables.

Figure 17:
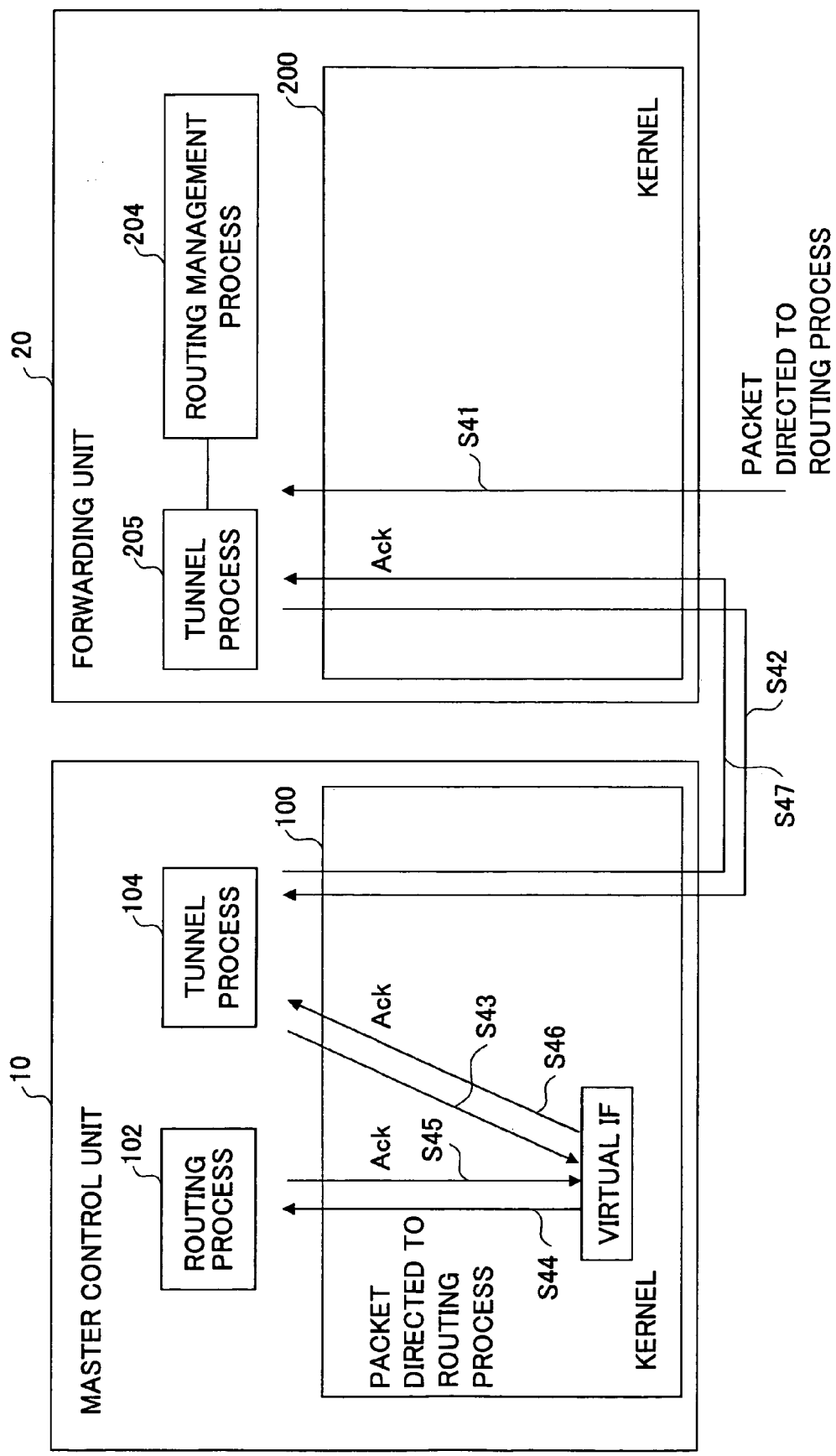
FIG. 17 is a block diagram illustrating an operation of detecting an operation state of a routing process of a master control unit in the network apparatus according to the fourth embodiment.

FIG. 17 illustrates an exemplary operation for detecting the operation state of the routing process of the master control unit in the network apparatus according to the fourth embodiment.

In the example of FIG. 17, when the tunnel process 205 of the forwarding unit 20 receives a packet directed to a routing process from an external network (step S41), it transmits this packet to the tunnel process 104 of the master control unit 10 (step S42). The tunnel process 205 of the forwarding unit 20 then waits to receive an Ack packet from the tunnel process 104 of the master control unit 10 (step S47). Upon receiving the packet from the tunnel process 205, the tunnel process 104 of the master control unit 10 transmits this packet to the routing process 102 via a virtual interface (steps S43 and S44). In turn, the routing process 102 updates its routing table and sends an Ack packet to the tunnel process 205 corresponding to the sender of the packet (steps S45, S46, and S47).

The routing management process 204 of the forwarding unit 20 monitors the tunnel process 205 to determine whether the tunnel process 205 acquires the Ack packet within a predetermined time period. In the case where the tunnel process 205 acquires the Ack packet within the predetermined time period, it may be confirmed that the routing process 102 of the master control unit 10 is operating properly. On the other hand, if the Ack packet is not received within the predetermined time period, the routing management process 204 determines that the operation of the routing process 102 of the master control unit 10 has ended abnormally and signals another slave control unit to activate its routing process. Then, upon confirming that the new routing process has been properly activated, the routing management process 204 switches its tunnel to the routing process from the present master control unit to the slave control unit at which the new routing process is activated.

FIG. 18 shows a configuration of a network apparatus according to another embodiment in which a control unit has an independent routing process. A master control unit and a slave control unit may be arranged to have their own actual interfaces, in which case they may be arranged to conduct packet transmission/reception processes aside from proxy execution of an application transferred from the forwarding unit. In this case, the control units need to generate their own routing tables for their actual interfaces instead of relying on the routing synchronization process described above.

In FIG. 18, the actual interfaces eth0, eth1, eth2, and eth3 of the forwarding unit 20 respectively correspond to the virtual interfaces vif0, vif1, vif2, and vif3 of the master control unit 10 and the slave control unit 11. The actual interfaces eth0, eth1, eth2, and eth3 are connected to external networks 30, 31, 32, and 33, respectively. The slave control unit 11 has its own actual interface that is connected to another network 34. Accordingly, the slave control unit 11 has an independent routing process 116, and a routing table 115 that is managed by the routing process 116. In this case, the routing process 116 of the slave control unit 11 operates independently from the routing process 102 of the master control unit 10, and the routing table 115 is independently managed. It is noted that in a case where plural actual interfaces and virtual interfaces are provided in the control unit, the interfaces are preferably grouped into an actual interface group and a virtual interface group.

FIG. 19 shows an exemplary grouping of interfaces within control apparatuses. In the present example, as opposed to the example of FIG. 18, the master control unit 10 also includes its own routing table 105 and routing process 106.

In FIG. 19, the master control unit 10 includes actual interfaces PIF01 and PIF02, and virtual interfaces VIF11, VIF12, VIF13, VIF14, and VIF15 that are grouped into different interface groups. The slave control unit 11 includes actual interfaces PIF01 and PIF02, and virtual interfaces VIF12, VIF13, and VIF15 that are grouped into different interface groups. The virtual interfaces of the control apparatuses 10 and 11 are mapped to actual interfaces PIF11, PIF12, PIF13, PIF14, and PIF15 of the forwarding unit 20 so as to establish correspondence between the virtual interfaces and the actual interfaces. The master control unit 10, the slave control unit 11, and the forwarding unit 20 are interconnected via one of the actual interfaces (e.g., actual interfaces PIF01 (2), PIF11, and PIF15), and a packet may be transferred via these actual interfaces.

Also, a routing table is provided in each control unit for each interface group. The routing tables 101 and 111 for the interface groups including the virtual interfaces of the control units 10 and 11 are respectively managed by the routing synchronization processes 103 and 113 as described above. As for the interface group including the actual interfaces of the control units 10 and 11, routing control may be conducted by routing processes 106 and 116, respectively. Alternatively, static routing may be conducted with respect to the actual interface groups instead of conducting the dynamic routing control as described above.

It is noted that the present invention is not limited to the above described embodiments, and variations and modifications may be made without departing from the scope of the present invention.

The present application is based on and claims the benefit of the earlier filing date of Japanese Patent Application No. 2004-105972 filed on Mar. 31, 2004, the entire contents of which are hereby incorporated by reference.

What is claimed is:

1. A routing table synchronization method that is used in a network apparatus including a forwarding unit corresponding to a base point for conducting packet transmission and reception with an external network, and a plurality of control units for operating a plurality of applications that are arranged to access virtual interfaces of the control units that correspond to actual interfaces of the forwarding unit so that the network apparatus appears from the outside to be functioning as a single unit, the routing table synchronization method comprising:

executing a routing process of generating a routing table at a master control unit corresponding to one of the control units;

updating a routing table of the forwarding unit by a routing synchronization process that operates independently from the routing process if the routing table of the master control unit is updated;

updating one or more routing tables of one or more slave control units corresponding to the control units other than the master control unit through the forwarding unit;

refraining from transmitting routing information pertaining to at least one of the virtual interfaces to at least one of the slave control units that implement said at least one of the virtual interfaces if said at least one of the virtual interfaces is down;

transmitting a signal to at least one of the slave control units to delete routing information pertaining to at least one of the virtual interfaces from at least one of the routing tables of said at least one of the slave control units if it is determined that an operating state of said at least one of the virtual interfaces is switched from an up state to a down state; and transmitting routing information pertaining to at least one of the virtual interfaces to at least one of the slave control units that implement said at least one of the virtual interfaces if it is determined that an operation state of said at least one of the virtual interfaces is switched from a down state to an up state.

2. The routing table synchronization method as claimed in claim 1, further comprising:

refraining from registering routing information from the forwarding unit pertaining to at least one of the virtual interfaces into at least one of the routing tables of the slave control units that implement said at least one of the virtual interfaces if said at least one of the virtual interfaces is down;

deleting routing information pertaining to at least one of the virtual interfaces from at least one of the routing tables of the slave control units if it is determined that an operating state of said at least one of the virtual interfaces is switched from an up state to a down state; and registering routing information pertaining to at least one of the virtual interfaces into at least one of the routing tables of the slave control units that implement said at least one of the virtual interfaces if it is determined that an operation state of said at least one of the virtual interfaces is switched from a down state to an up state.

3. The routing table synchronization method as claimed in claim 1, further comprising:

transmitting a signal to one of the slave control units to activate a new routing process if it is determined that the routing process of the master control unit no longer operates properly; and switching a destination of a routing packet that is originally directed to the master control unit to the slave control unit at which the new routing process is activated if it is determined that the new routing process is operating properly at said slave control unit.

4. A network apparatus that realizes packet transmission and reception with an external network using a forwarding unit as a base point and operation of a plurality of applications using a plurality of control units, the applications being arranged to access virtual interfaces of the control units corresponding to actual interfaces of the forwarding unit so that the network apparatus appears from the outside to be functioning as a single unit, the network apparatus comprising:

a routing part that is included in a master control unit corresponding to one of the control units, and is configured to generate a routing table that indicates an interface to which a packet is to be transmitted;

a first routing synchronization part that is included in the master control unit and operates independently from the routing part, the first routing synchronization part being configured to receive a signal from a kernel of the master control unit indicating that the routing table of the master control unit is updated, and transmit routing information pertaining to the updating to the forwarding unit in response to the received signal;

a second routing synchronization part that is included in the forwarding unit and is configured to receive the routing information from the first routing synchronization part, update a routing table of the forwarding unit based on the received routing information, and transmit the routing information to one or more slave control units corresponding to the control units other than the master control unit; and one or more third routing synchronization parts that are included in the one or more slave control units, and are configured to receive the routing information from the second routing synchronization part and update one or more routing tables of the one or more slave control units based on the received routing information.

5. The network apparatus as claimed in claim 4, wherein the second routing synchronization part of the forwarding unit is configured to:

refrain from transmitting routing information pertaining to at least one of the virtual interfaces to at least one of the slave control units including said at least one of the virtual interfaces if said at least one of the virtual interfaces is down;

transmit a signal to at least one of the slave control units to delete routing information pertaining to at least one of the virtual interfaces from at least one of the routing tables of said at least one of the slave control units if it is determined that an operating state of said at least one of the virtual interfaces is switched from an up state to a down state; and transmit routing information pertaining to at least one of the virtual interfaces to at least one of the slave control units including said at least one of the virtual interfaces if it is determined that an operation state of said at least one of the virtual interfaces is switched from a down state to an up state.

6. The network apparatus as claimed in claim 4, wherein the one or more third routing synchronization parts of the one or more slave control units are configured to:

refrain from registering routing information from the forwarding unit pertaining to at least one of the virtual interfaces into the one or more routing tables thereof if said at least one of the virtual interfaces is down;

delete routing information pertaining to at least one of the virtual interfaces from the one or more routing tables thereof if it is determined that an operating state of said at least one of the virtual interfaces is switched from an up state to a down state; and register routing information pertaining to at least one of the virtual interfaces into the one of more routing tables thereof if it is determined that an operation state of said at least one of the virtual interfaces is switched from a down state to an up state.

7. The network apparatus as claimed in claim 4, wherein the forwarding unit is configured to:

transmit a signal to one of the slave control units to activate a new routing process if it is determined that the routing process of the master control unit no longer operates properly; and switching a destination of a routing packet that is originally directed to the master control unit to the slave control unit at which the new routing process is activated if it is determined that the new routing process is operating properly at said slave control unit.

8. A computer-readable recording medium storing a routing table synchronization program which, when executed by a computer of a network apparatus, causes the computer to perform a routing table synchronization method, the network apparatus including a forwarding unit corresponding to a base point for conducting packet transmission and reception with an external network, and a plurality of control units for operating a plurality of applications that are arranged to access virtual interfaces of the control units that correspond to actual interfaces of the forwarding unit so that the network apparatus appears from the outside to be functioning as a single unit, the routing table synchronization method comprising:

executing a routing process of generating a routing table at a master control unit corresponding to one of the control units;

updating a routing table of the forwarding unit if the routing table of the master control unit is updated;

updating one or more routing tables of one or more slave control units corresponding to the control units other than the master control unit in response to the updating of the routing table of the forwarding unit;

refraining from transmitting routing information pertaining to at least one of the virtual interfaces to at least one of the slave control units that implement said at least one of the virtual interfaces if said at least one of the virtual interfaces is down;

transmitting a signal to at least one of the slave control units to delete routing information pertaining to at least one of the virtual interfaces from at least one of the routing tables of said at least one of the slave control units if it is determined that an operating state of said at least one of the virtual interfaces is switched from an up state to a down state; and transmitting routing information pertaining to at least one of the virtual interfaces to at least one of the slave control units that implement said at least one of the virtual interfaces if it is determined that an operation state of said at least one of the virtual interfaces is switched from a down state to an up state;

wherein the updating the routing tables of the forwarding unit and the one or more slave control units is executed independently from the routing process.

9. The computer-readable recording medium as claimed in claim 8, wherein the routing table synchronization method further comprises:

refraining from registering routing information from the forwarding unit pertaining to at least one of the virtual interfaces into at least one of the routing tables of the slave control units that implement said at least one of the virtual interfaces if said at least one of the virtual interfaces is down;

deleting routing information pertaining to at least one of the virtual interfaces from at least one of the routing tables of the slave control units if it is determined that an operating state of said at least one of the virtual interfaces is switched from an up state to a down state; and registering routing information pertaining to at least one of the virtual interfaces into at least one of the routing tables of the slave control units that implement said at least one of the virtual interfaces if it is determined that an operation state of said at least one of the virtual interfaces is switched from a down state to an up state.

10. The computer-readable recording medium as claimed in claim 8, wherein the routing table synchronization method further comprises:

transmitting a signal to one of the slave control units to activate a new routing process if it is determined that the routing process of the master control unit no longer operates properly; and switching a destination of a routing packet that is originally directed to the master control unit to the slave control unit at which the new routing process is activated if it is determined that the new routing process is operating properly at said slave control unit.

* * * * *